United States Patent
Ruggiero

(10) Patent No.: US 7,853,044 B2
(45) Date of Patent: Dec. 14, 2010

(54) VIDEO PROCESSING SYSTEM AND METHOD WITH DYNAMIC TAG ARCHITECTURE

(75) Inventor: Carl J. Ruggiero, Tigard, OR (US)

(73) Assignee: NVIDIA Corporation, Santa Clara, CA (US)

(*) Notice: Subject to any disclaimer, the term of this patent is extended or adjusted under 35 U.S.C. 154(b) by 1207 days.

(21) Appl. No.: 11/182,719

(22) Filed: Jul. 15, 2005

(65) Prior Publication Data

US 2006/0153473 A1 Jul. 13, 2006

Related U.S. Application Data

(63) Continuation-in-part of application No. 11/036,462, filed on Jan. 13, 2005, now Pat. No. 7,308,159.

(51) Int. Cl.
G06K 9/00 (2006.01)
(52) U.S. Cl. ..................................................... 382/107
(58) Field of Classification Search .................. 382/107
See application file for complete search history.

(56) References Cited

U.S. PATENT DOCUMENTS

| | | | |
|---|---|---|---|
| 4,641,188 A | 2/1987 | Dischert | |
| 4,881,125 A | 11/1989 | Krause | |
| 4,982,280 A | 1/1991 | Lyon et al. | |
| 5,301,020 A | 4/1994 | Cassereau | |
| 5,309,526 A | 5/1994 | Pappas et al. | |
| 5,317,398 A | 5/1994 | Casavant et al. | |
| 5,347,314 A | 9/1994 | Faroudja et al. | |
| 5,398,071 A | 3/1995 | Gove et al. | |
| 5,414,469 A | 5/1995 | Gonzales et al. | |
| 5,469,223 A | 11/1995 | Kimura | |
| 5,508,747 A * | 4/1996 | Lee | 348/441 |
| 5,532,751 A | 7/1996 | Lui | |
| 5,563,660 A | 10/1996 | Tsukagoshi | |
| 5,604,821 A | 2/1997 | Ranganathan et al. | |
| 5,614,952 A | 3/1997 | Boyce et al. | |
| 5,621,470 A | 4/1997 | Sid-Ahmed | |
| 5,631,706 A | 5/1997 | Tsunashima | |
| 5,661,525 A | 8/1997 | Kovacevic et al. | |
| 5,682,442 A | 10/1997 | Johnston et al. | |
| 5,689,305 A | 11/1997 | Ng et al. | |
| 5,757,670 A | 5/1998 | Ti et al. | |
| 5,784,175 A | 7/1998 | Lee | |
| 5,787,206 A | 7/1998 | Williams et al. | |
| 5,790,196 A | 8/1998 | Sun et al. | |
| 5,790,714 A | 8/1998 | McNeil et al. | |
| 5,805,724 A | 9/1998 | Metcalfe et al. | |
| 5,822,464 A | 10/1998 | Metcalfe | |
| 5,920,659 A | 7/1999 | Iverson et al. | |
| 5,933,539 A | 8/1999 | Metcalfe et al. | |
| 5,943,099 A | 8/1999 | Kim | |
| 5,970,178 A | 10/1999 | Lin | |
| 6,005,621 A | 12/1999 | Linzer et al. | |

(Continued)

Primary Examiner—Wes Tucker
(74) Attorney, Agent, or Firm—Alleman Hall McCoy Russell & Tuttle LLP

(57) ABSTRACT

An image processing system including a plurality of image processors. Each image processor is configured to carry out a different image processing operation. The system also includes a motion estimator. For image processor, the motion estimator is configured to obtain motion information for a pixel or pixels being applied as a processing input to the image processor.

24 Claims, 16 Drawing Sheets

U.S. PATENT DOCUMENTS

| | | | |
|---|---|---|---|
| 6,026,182 A | 2/2000 | Lee et al. | |
| 6,038,256 A | 3/2000 | Linzer et al. | |
| 6,064,407 A | 5/2000 | Rogers | |
| 6,075,875 A | 6/2000 | Gu | |
| 6,091,777 A | 7/2000 | Guetz et al. | |
| 6,121,978 A | 9/2000 | Miler | |
| 6,137,837 A | 10/2000 | Nemiroff et al. | |
| 6,157,365 A | 12/2000 | Callway | |
| 6,184,908 B1 | 2/2001 | Chan et al. | |
| 6,189,064 B1 | 2/2001 | MacInnis et al. | |
| 6,201,577 B1 | 3/2001 | Swartz | |
| 6,282,587 B1 | 8/2001 | Priem et al. | |
| 6,301,428 B1 | 10/2001 | Linzer | |
| 6,327,000 B1 | 12/2001 | Auld et al. | |
| 6,339,434 B1 | 1/2002 | West et al. | |
| 6,356,589 B1 | 3/2002 | Gebler et al. | |
| 6,366,317 B1 | 4/2002 | Mattison et al. | |
| 6,512,550 B1 | 1/2003 | de Garrido et al. | |
| 6,519,367 B2 | 2/2003 | Nagarajan et al. | |
| 6,529,633 B1 | 3/2003 | Easwar et al. | |
| 6,532,264 B1 | 3/2003 | Kahn | |
| 6,545,719 B1 | 4/2003 | Topper | |
| 6,567,559 B1 | 5/2003 | Easwar | |
| 6,606,415 B1 | 8/2003 | Rao | |
| 6,611,260 B1 | 8/2003 | Greenberg et al. | |
| 6,671,319 B1 | 12/2003 | Chang et al. | |
| 6,680,752 B1 | 1/2004 | Callway et al. | |
| 6,707,467 B1 | 3/2004 | Suga | |
| 6,717,622 B2 | 4/2004 | Lan | |
| 6,757,022 B2 | 6/2004 | Wredenhagen et al. | |
| 6,775,334 B1 | 8/2004 | Liu et al. | |
| 6,788,353 B2 | 9/2004 | Wredenhagen et al. | |
| 6,868,189 B1 | 3/2005 | Hoshino | |
| 2002/0159641 A1 | 10/2002 | Whitney et al. | |
| 2002/0159642 A1 | 10/2002 | Whitney | |
| 2002/0164070 A1 | 11/2002 | Kuhner et al. | |
| 2003/0021483 A1 | 1/2003 | Goertzen | |
| 2003/0044061 A1 | 3/2003 | Prempraneerach et al. | |
| 2003/0081836 A1 | 5/2003 | Averbuch et al. | |
| 2003/0103567 A1 | 6/2003 | Riemens et al. | |
| 2005/0063586 A1 | 3/2005 | Munsil et al. | |

\* cited by examiner

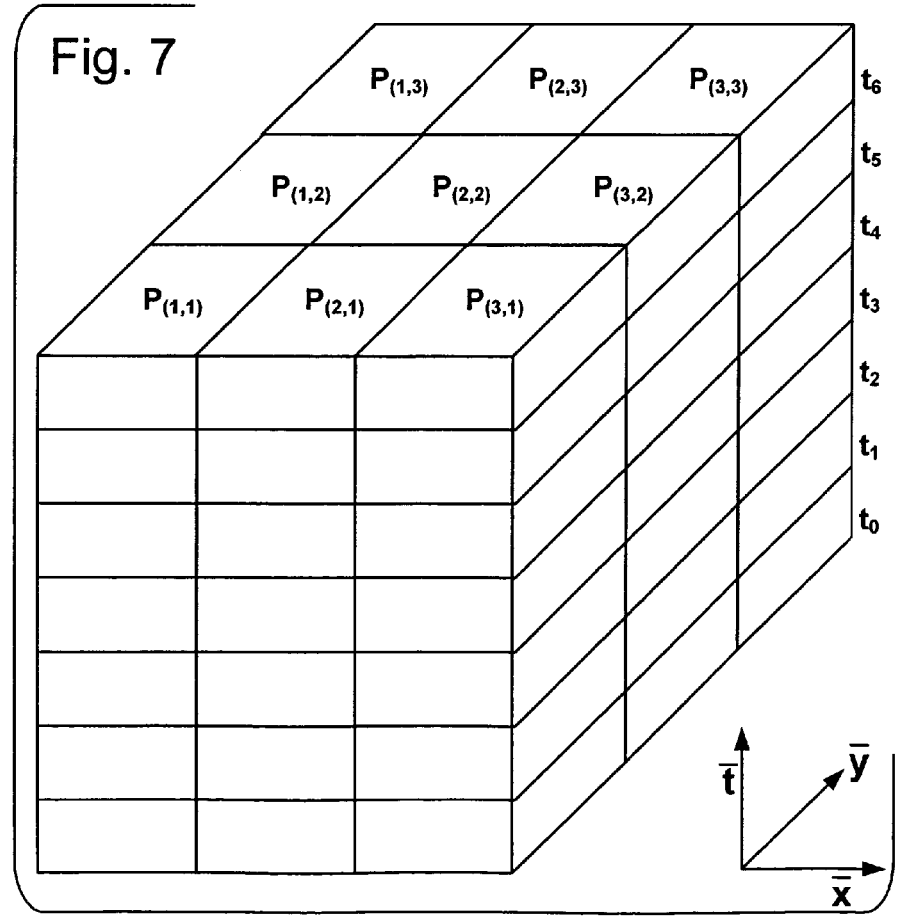

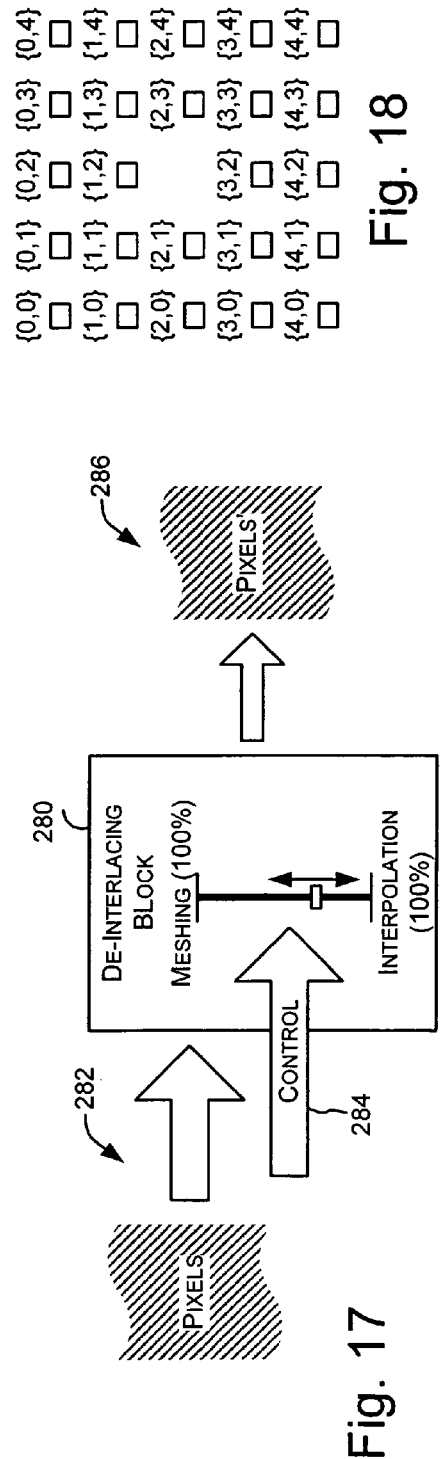

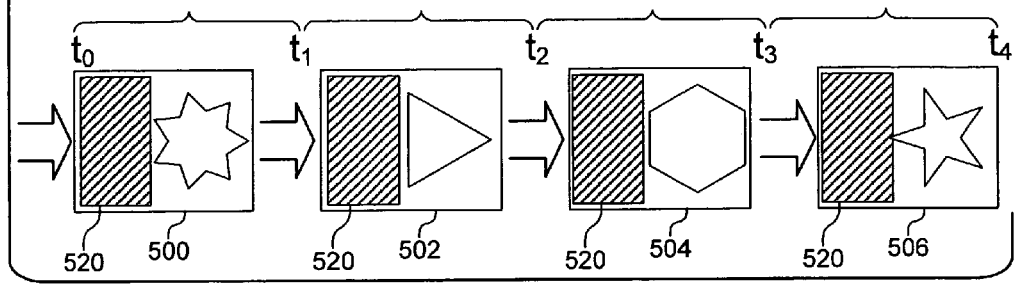
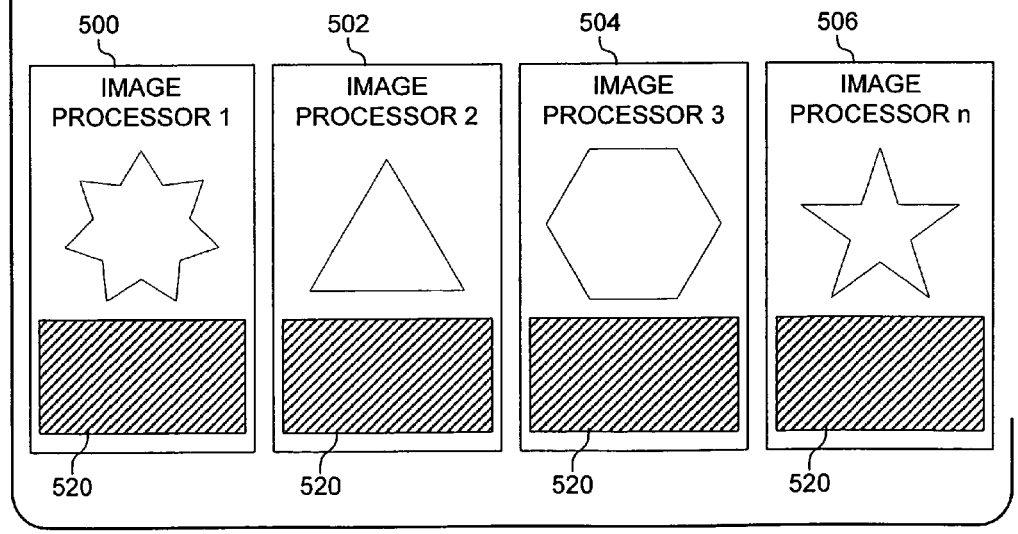

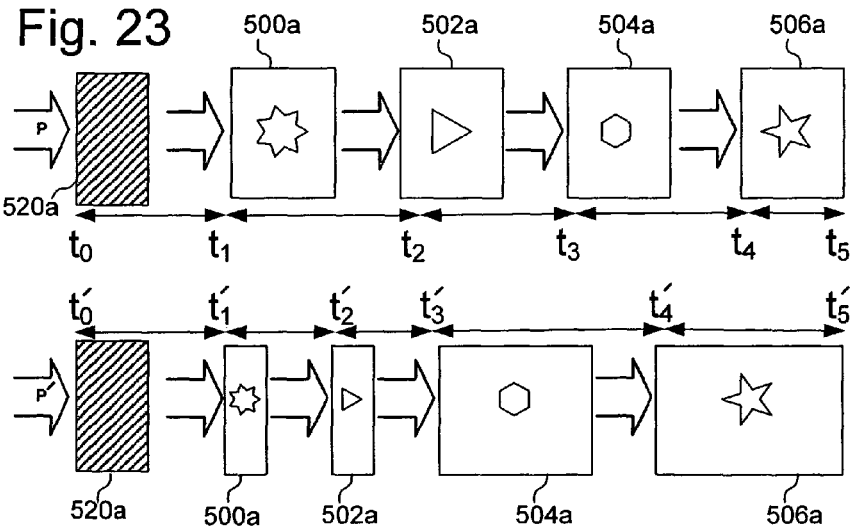
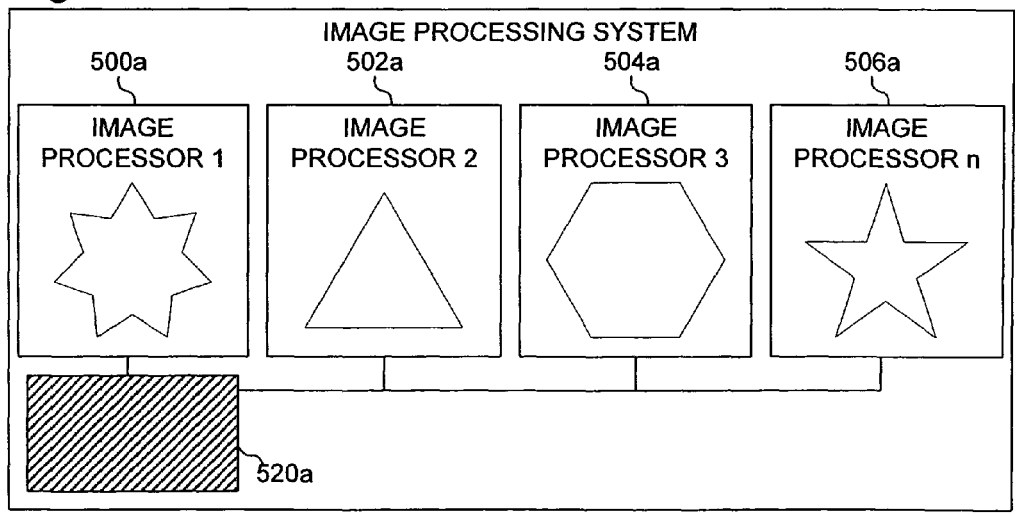

Fig. 27

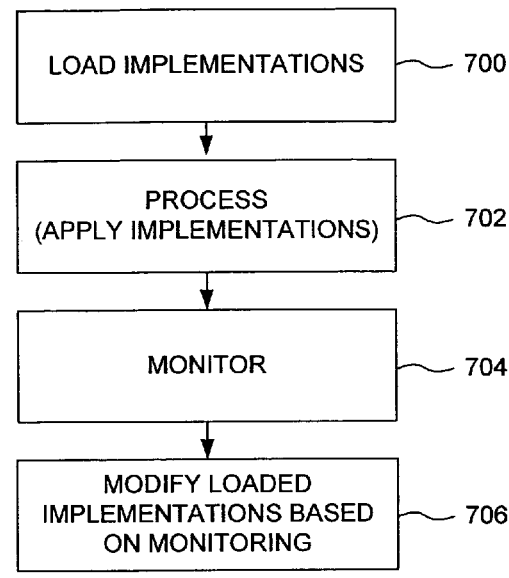

- LOAD IMPLEMENTATIONS — 700
- PROCESS (APPLY IMPLEMENTATIONS) — 702
- MONITOR — 704
- MODIFY LOADED IMPLEMENTATIONS BASED ON MONITORING — 706

Fig. 28

| TAG STATE | SETTING |
|---|---|
| $\Theta_1$ | $IP1 \Rightarrow IP1_b$<br>$IP2 \Rightarrow IP2_a$<br>$IP3 \Rightarrow IP3_d$ |
| $\Theta_2$ | $IP1 \Rightarrow IP1_{a.3}$<br>$IP2 \Rightarrow IP2_h$<br>$IP3 \Rightarrow IP3_4$ |
| $\Theta_3$ | $IP1 \Rightarrow [IP1_{a.4}, IP1_b, IP1_d, IP1_{f.8}, IP1_c, IP1_{c.3}, IP1_h, IP1_c]$<br>$IP2 \Rightarrow [IP2_g, IP2_{g.2}, IP2_{g.5}, IP2_k, IP2_n, IP2_{p.5}, IP2_x, IP2_{v.9}]$ |
| $\vdots$<br>$\Theta_k$ | No Change or Default |

Fig. 29

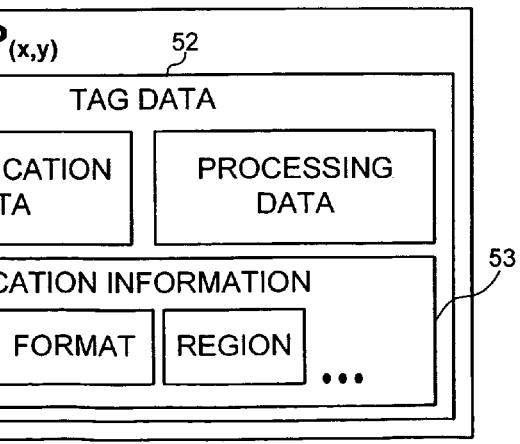

$P_{(x,y)}$

- PIXEL DATA (50)
- TAG DATA (52)
  - CLASSIFICATION DATA
  - PROCESSING DATA
  - SOURCE IDENTIFICATION INFORMATION (53)
    - BROADCAST | DEVICE | FORMAT | REGION | ...

VIDEO PROCESSING SYSTEM AND METHOD WITH DYNAMIC TAG ARCHITECTURE

CROSS-REFERENCE TO RELATED APPLICATIONS

The present application is a continuation-in-part of, and claims priority to, U.S. patent application Ser. No. 11/036,462, filed Jan. 13, 2005, now U.S. Pat. No. 7,308,159 titled "IMAGE PROCESSING SYSTEM AND METHOD WITH DYNAMICALLY CONTROLLED PIXEL PROCESSING" and having the same assignee as the present application, the entire contents of which are hereby incorporated by reference.

BACKGROUND

Many systems and methods exist for processing video signals. Prior image processing systems capable of handling digital signals commonly include processing blocks for performing various operations on the pixels that comprise a digital video stream. These operations may include de-interlacing, increasing or reducing resolution, etc. Typical prior systems employ pre-determined, fixed processing algorithms for these operations. The different processing operations operate substantially independent of one another, and processing is not tuned or modified in response to changed pixel characteristics. The substantially independent architectures employed in prior systems can result in large silicon implementations, increased manufacturing expense, and can produce structural and/or functional redundancies and inefficiency. These issues can limit the ability of prior systems to effectively address processing considerations that ultimately affect quality of the images presented to the viewer.

BRIEF DESCRIPTION OF THE DRAWINGS

FIGS. 5 and 6 illustrate temporal aspects of processing operations carried out by the image processing system of FIGS. 1 and 2.

FIG. 7 depicts an exemplary illustrative scheme for storage of pixel and tag data in the image processing systems and methods of the present description.

FIGS. 16 and 17 depict interlaced video frames and a dynamically controllable processing block for performing de-interlacing operations.

FIG. 18 depicts, in the context of an image interpolation processing operation, a pixel grid and a target pixel to be interpolated from one or more known pixel values in the grid.

FIGS. 21 and 22 schematically depict aspects of prior image processing systems.

FIG. 23 schematically illustrates flexible allocation of processing resources in an image processing system that performs multiple pixel processing operations on a digital video signal.

FIG. 24 schematically depicts structural/function consolidation and sharing in a multi-operation image processing system according to the present description.

FIGS. 25, 26 and 27 depict a system and method for selectively loading and unloading plural image processing implementations selected from a larger set of available implementations.

FIG. 28 depicts various exemplary correlations between specific tag information and image processing settings, where the correlated image processing settings may include specification of one or more implementations of an image processing operation (e.g., deinterlacing, scaling, etc.)

FIG. 29 depicts source identification information which may form part of the tag information associated with a pixel or pixels.

DETAILED DESCRIPTION

Figure 1:
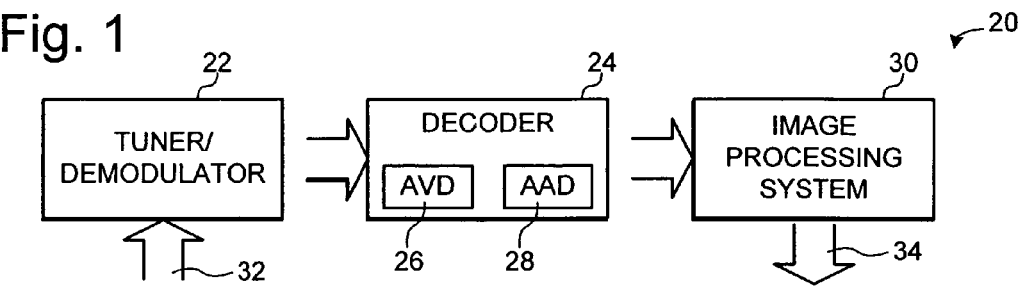
FIG. 1 schematically depicts an embodiment of an image processing system according to the present description.

FIG. 1 indicates an image processing system generally at 20. System 20 may include a tuner/demodulator 22 and a decoder 24. Decoder 24 may include, among other things, an analog video decoder 26 and an analog audio decoder 28. Components 22 and 24 typically are configured to receive incoming video/audio signals, and convert those signals into digital signals that are applied as inputs to digital image processing system 30.

Blocks 22 and/or 24 may be configured to handle analog and/or digital inputs. In the case of analog video, subcomponents may be employed to capture and/or decode an analog video signal, so as to produce corresponding pixels representing the input video frame(s). For example, an analog video decoder including a suitable analog to digital converter (ADC) may be employed to produce pixels representing the input video frame. These pixels may then be clocked into or otherwise applied to the processing pipeline. In typical embodiments, the pixels are serially clocked into the system.

For analog video, a device such as the Philips 7119 may be used to provide the pixels to be captured by the processing pipeline. For images captured through an analog to digital converter or from a DVI source, a device such as the Analog Devices 9887 may be used to provide pixels to be captured by the processing pipeline.

Additionally, or alternatively, blocks 22 and/or 24 may be configured to handle digital video input. In the case of digital video, a suitable digital video decoder may be implemented so as to reconstruct image frames. During the decode process, and at other points during processing, classification data may be associated with the pixels based upon the methods that were used to reconstruct the pixel. Current digital video decoders from companies such as Conexant (CX22490) or LSI Logic (SC2005) may be employed in connection with the embodiments described herein.

System 20 may be configured to receive and process incoming audio/video signals 32 in a variety of different formats/standards, including NTSC, SECAM, PAL, SDTV, HDTV, etc. System 20 may be implemented, in whole or in part, within a set top, box, television, video monitor, video card, or any other device/system that processes or displays images. System 20 may be implemented as a set of discrete chips, fabricated within a single contiguous piece of silicon, or configured in any other practicable implementation.

When used to process video images, system 20 typically outputs pixels at regular intervals to preserve the timing of the input video signal (e.g., an HDTV signal). Commonly, there is some processing delay associated with the processing of the video signals by system 20, such that processing for a given video field or frame (or group of pixels) occurs during a uniform time interval.

As explained in more detail below, digital processing system 30 may be configured to generate and maintain meta data for the pixels that are being digitally processed. This data may be appended to a pixel or pixels as discrete bits, mult-bit parameters, and/or in any other desired format or syntax. This data may be used to flag the presence of a particular characteristic (such as a detected edge). A multi-bit field may be used to store a numeric value which indicates the quantity of a characteristic present in the pixels (such as motion). The meta data, also referred to herein as tag information or tag data, may be advantageously used in image processing operations to provide increased processing efficiency and improved image quality.

Figure 3:
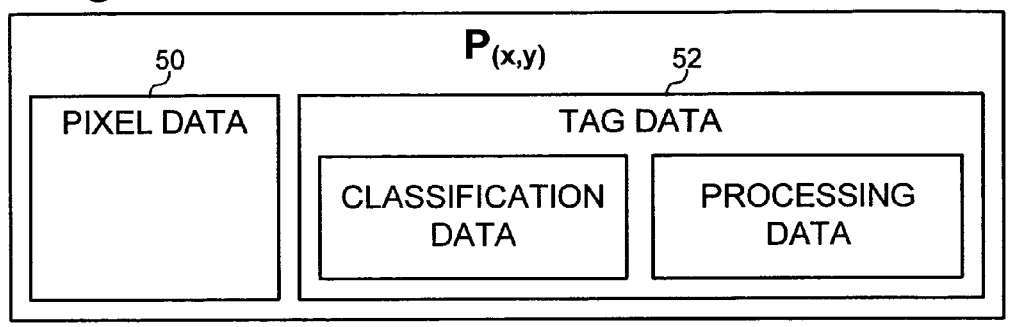
FIGS. 3 and 4 depict an exemplary association between pixel data and tag data that may be used to dynamically control pixel processing operations.
Figure 4:
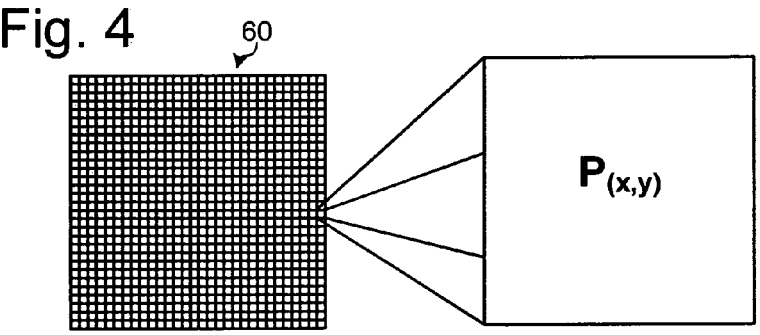

FIGS. 3 and 4 schematically illustrate exemplary pixel data 50 and its associated tag data 52. Pixel data 50 may be represented in a variety of different ways. In typical implementations, pixel data 50 is represented using tristimulus values of a desired color space, such as a three-field RGB value. Tag data 52 may include a variety of different information pertaining to properties or characteristics of the associated pixel or pixels (e.g., such as the edge information mentioned above). Tag data 52 may also include information concerning processing operations that have been or will be performed on the associated pixels. The tag data will be explained in more detail below. A pixel and its associated tag data may be referred to using the notation P(x,y), where the x and y subscript denotes the rectilinear coordinate position of the pixel within video frame 60.

As discussed above, typically there is a time delay or interval during which pixels are processed by digital processing system 30, with output pixels being transmitted at regular intervals from system 30 to preserve the timing of the video signal. The input and output timing of system 30 may be seen in FIGS. 5 and 6. In particular, it will be seen that image processing system 30 outputs the modified output pixels (modifications indicated with P' notation) at a time n after the corresponding input pixels are applied as inputs to the processing system. Thus, a pixel or group of pixels (e.g., a video field) applied to the system at a given time will typically be output after an interval of duration n has elapsed, with the interval typically remaining substantially constant over time for different video fields/frames.

Typically, digital processing system 30 performs multiple image processing operations on pixels during the time interval between input of pixels to system 30, and the output of the corresponding processed output pixels. System 30 may be configured to repeatedly obtain and update tag data associated with pixels being processed by the system. The tag data may be repeatedly obtained and updated as the pixels are being processed (e.g., changed) by the multiple processing operations. As discussed in detail below, the dynamic tag data may be used to dynamically control and tune one or more of the image processing operations.

Processing digital video commonly involves performing multiple image processing operations, as indicated above. Common image processing operations include deinterlacing, image scaling/interpolation (e.g., via supersampling or sub-sampling), color processing, noise filtering, luminance/chrominance separation, boosting/enhancing, etc. It should be understood that each image processing operation may be implemented in a variety of different ways. For example, one implementation of deinterlacing might be to employ field meshing or line averaging. Another implementation might involve interpolation or derivation of a target pixel, based on known values or characteristics of neighboring pixels. Indeed, different implementations of a given image processing operation might include different processing algorithms, constants, parameters, filter coefficients, pixel transformation techniques, etc.

Typically, the pixels to be processed are clocked serially into the multiple processing operations in pipeline fashion, such that the pixels are processed by a first processing operation (e.g., deinterlacing), then by a second operation (e.g., scaling), etc. This serial processing arrangement may also be referred to as a pipeline configuration. It should be appreciated, however, that the pipeline and serial terminology is not intended to imply any particular physical or spatial configuration of the operative components. In some implementations, the logic circuitry performing the different operations is spatially distinct, while in others the logic for multiple operations is substantially in one location. In addition, in pipeline configurations, the processing operations may be performed in any particular order, and the order of operation may be dynamically changed on the fly in certain implementations.

In prior image processing systems having multiple image processing operations, the different processing operations are often designed independently by different manufacturers. A given processing block typically is designed to perform in a variety of different settings, and to be highly interoperable and compatible with components and architectures of varying configurations and different manufacturers. Accordingly, a given type of processing block typically is designed to be relatively self-sufficient and self-contained. One reason for this is that it normally is not known beforehand what other components might be present in the overall system in which it is to be used.

Accordingly, in prior systems, certain types of functionality are typically built into or incorporated within each of the different image processing operations. Motion estimation, for example, is a base-level function that must be performed for various different processing operations, since motion greatly affects image processing. Thus, in a system having deinterlacing, scaling and color processing operations, it is common to find three separate motion estimation blocks, one being associated with each of the three different image processing operations.

Such replication of functionality will at times be undesirable. For example, multiple motion estimation blocks can provide an inconsistent view of motion occurring within the video data, as it is likely that each block will employ a different motion assessment methodology. The redundant functionality also will result in larger circuits and silicon instantiation, which in turn can lead to higher manufacturing costs. A variety of other inefficiencies may result from such redundant functionality. For example, in a deinterlacing circuit with an associated built-in motion estimator, motion estimation calls might be performed during every deinterlacing operation, regardless of whether the motion information is needed.

Accordingly, in many cases it will be desirable to configure the image processing system with an architecture that enables enhanced interaction between and sharing of data among system components, and in particular, between and among image processing operations. An embodiment of an image processing system having such an enhanced architecture is shown generally at 30 in FIGS. 2 and 2A. As indicated, system 30 may include multiple image processing operations, which are indicated schematically as image processing blocks 44. Included among image processing blocks 44 may be a deinterlacer, an image interpolator, a color processor, an image enhancer/booster, and/or various other image processing blocks/operations. Image processors 44 are configured to process input pixels 40, so as to enable the system to output output pixels 42.

Image processing system 30 also includes a classifier 46, which is a block or process configured to obtain classification or other data associated with a pixel or group of pixels. This data is qualitatively different than the actual pixel data (e.g., the tristimulus RGB values), and typically describes a property or characteristic of the pixel of interest, and/or a processing operation associated with the pixel (e.g., a processing operation that has been performed on the pixel). These are merely examples of the type of data that may be associated with a pixel or pixels of interest. The associated data will be variously referred to herein as "meta data," or "tag data," and may include information about characteristics or properties of the pixels, processing operations that have been performed on the pixels, or any other desirable data that may be associated with or relevant to the pixels in question.

For example, the meta data may include the following information about a pixel or pixels: (1) spatial frequency; (2) temporal frequency; (3) direction of motion; (4) speed of motion; (5) contrast; (6) gradient information; (7) edge information/edge detection; (8) location/region of the pixel or pixels of interest, relative to the video frame or other frame of reference; (9) processing time; (10) object/shape recognition data; (11) digital video quantization information; (12) user settings; (13) customer preferences; (14) luminance, chrominance, brightness, hue, saturation, etc. (15); display device/source device characteristics; (16) maximum/minimum/average levels; (17) quantization scale factors; (18) inverse discrete cosine transform coefficients; (19) whether the pixels include text, graphics or other classifiable elements; (20) whether film mode is being employed; etc. This list is merely exemplary—many other types of information may be included in the tag information associated with the pixels.

Further, it should be noted that the tag data typically changes as the associated pixel is modified by the various processing operations of the system. In the exemplary embodiments described herein, the tag data typically is dynamically updated in real time as the pixels are being processed, and the updated data may be fed forward and backward to dynamically control/tune image processing operations of the system.

Classifier 46 may be configured to employ a variety of techniques to obtain tag data for a pixel or pixels, depending on the particular type of tag data. For example, spatial pixel comparisons may be employed to assess spatial frequencies, gradient information, edges, regional average values, etc. Temporal comparisons may be employed to assess motion and generate historical/statistical pixel data that may be employed to variously control the different image processing operations.

Classifier 46 typically includes a motion estimator 48 configured to obtain motion-related tag data. Motion estimator 48 may employ a variety of different methodologies or routines to analyze pixels over time and thereby assess the motion present in different parts of the video signal. As indicated above with respect to the classification information, the motion information may include speed and direction data. Adaptive, compensation, or other techniques may be employed, and analyses may be performed to identify and correct or compensate for occlusion problems.

Image processing system 30 may also include a controller 56 and memory 58, to coordinate image processing operations and facilitate processing and storage of image data. The controller and memory, and the other components of image processing system 30, may be implemented in a variety of different ways. For example, some or all of the components may be implemented on a single contiguous piece of silicon. Some or all of the components may be implemented as discrete chips in a chipset. In particular, controller 56 and image processing blocks 44 may be implemented in a single die of silicon along with a volatile memory, and a non-volatile memory may be implemented off chip but operatively coupled with the on-chip components. Typically, memory will include a volatile system memory (for example, implemented with DRAM), and a smaller, faster and more tightly coupled memory location (e.g., implemented with SRAM). The more tightly coupled memory may be employed in a cache manner, or to otherwise provide a faster, more readily accessible memory location. For example, as discussed below, it may be desirable in some cases to load a relatively small set of deinterlacing implementations into tightly coupled memory (e.g., SRAM) so that, during performance of deinterlacing, the deinterlacing operation can be executed and dynamically controlled by selecting from among the loaded deinterlacing implementations. By loading these implementations into SRAM, the implementations are more quickly and readily accessible than implementations resident in DRAM or in off-chip non-volatile storage (e.g., a flash card).

Regardless of the particular way that memory/storage is implemented, typically it is configured to allow storage of multiple frames of the video signal being processed. Referring to FIG. 7, the figure schematically illustrates storage of video data within the image processing system. Specifically, system memory may include storage of pixels in an image plane, such as the pixels in a video field or frame, that are applied at a given time to the system. For example, as shown in the figure, the memory includes a two dimensional array/grid of pixels for each of times $t_0$, $t_1$, $t_2$, $t_3$, $t_4$, $t_5$ and $t_6$. Each time might represent, for example, a distinct video frame within a video sequence.

Figure 2:
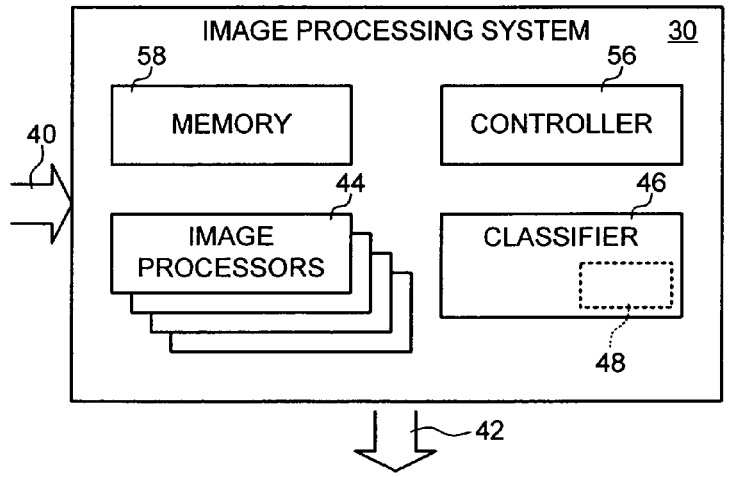
FIG. 2 schematically depicts a portion of the image processing system of FIG. 1.
Figure 2A:
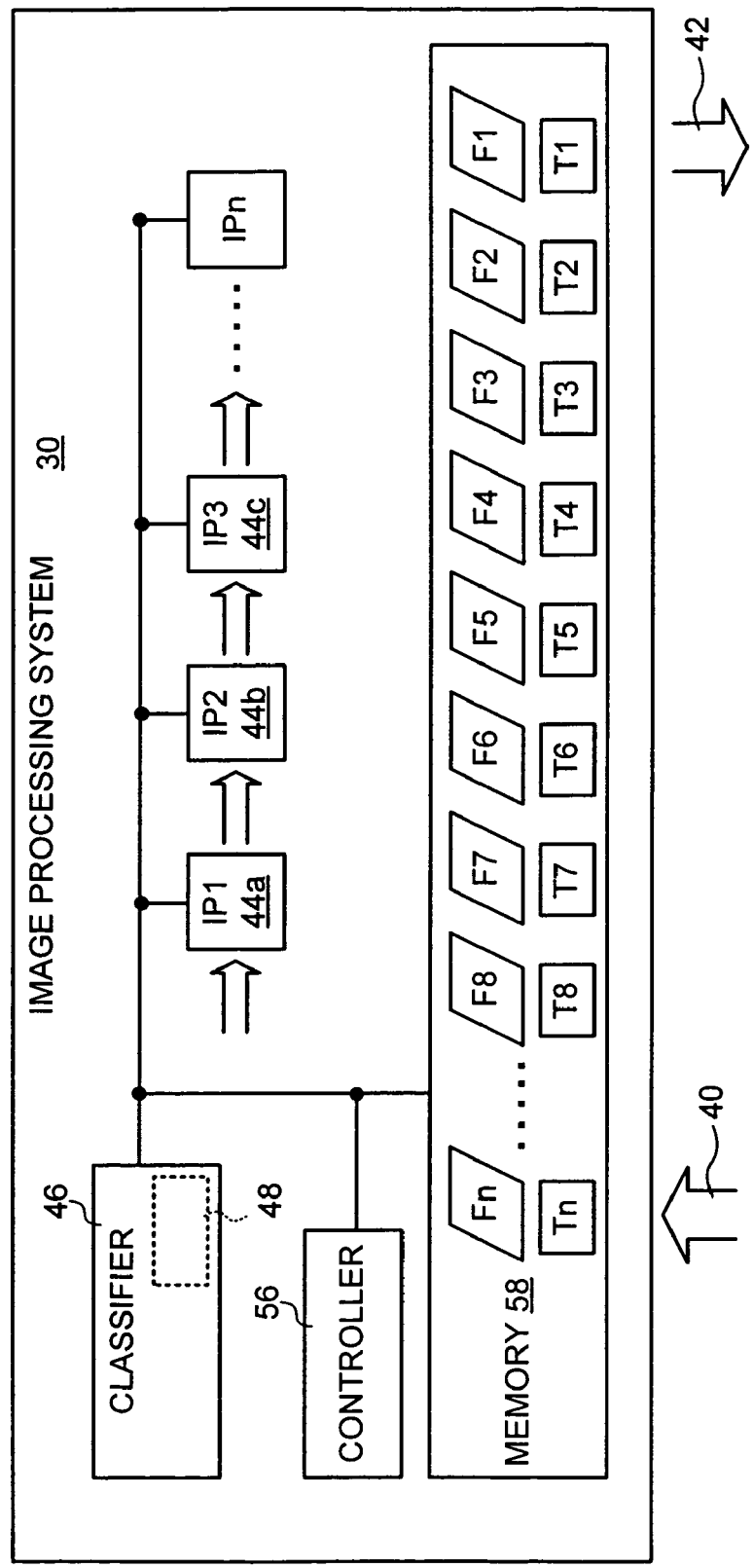
FIG. 2A is another schematic depiction of the portion of the image processing system shown in FIG. 2.

Thus for any given pixel of interest, the tag data may include spatial information (i.e., information derived from or related to other pixels within the same field/frame) and/or temporal information (i.e., information derived from or related to pixels input within a different field/frame than the pixel of interest). Additionally, or alternatively, as seen in FIG. 2A, multiple video frames of pixel data (F1, F2, etc.) may be stored within memory 58 in a frame buffer. Memory may also include tag data T1, T2, etc. associated with the frames of video data. Furthermore, because bus interconnections may be implemented between the depicted components, flexible data flow topologies may be employed, in which classifier 46, controller 56 and IP blocks 44 may access any of the stored pixel and tag data within memory. Thus, even if image processing block 44b were performing an operation (e.g., scaling) on frame F4 of pixel data, the pixel or tag data of any prior frame (F1 through F3) and/or any subsequent frame (F5 through Fn) could be accessed and employed to dynamically control the scaling operation being performed by block 44b on frame F4.

The availability of such information can greatly enhance the opportunities to improve the efficiency and quality of image processing operations. For example, gathered data within memory might indicate the presence of high spatial frequencies and sharply delineated edges in a particular spatial region, and that such conditions had persisted within the region for several video frames. From this tag information, it might be predicted that such conditions will continue. Based on such a prediction, one or more of the image processing operations may be dynamically adjusted to flexibly and dynamically accommodate the predicted characteristics of the incoming video signal.

For each pixel stored in system memory, the system typically also stores the tag data associated with the pixel, and a pointer or other correlation is established between the pixel and the meta data. Alternatively, rather than being associated with an individual pixel, tag data may be associated with a group of pixels, with an entire field/frame, and/or even with an entire stream of digital video data. As previously indicated, FIGS. 3 and 4 schematically depict the association between pixel data 50 and the tag data 52 associated with those pixels. As discussed above, tag data 52 may include information concerning characteristics or properties of pixels 50, and may also include information about processing operations that have been, or will be, performed on pixels 50. Still further, as will be explained below, the tag data may include classification or characterization of the source of the digital video being applied to the system for processing.

It will be appreciated that pixels 50 typically are modified between the time that they are applied as inputs to system 30 and the time that they are output. Accordingly, as the pixels change, the associated tag data 52 changes. Indeed, in typical embodiments, the associated tag data is repeatedly updated with the updated tag data being used to dynamically tune and modify the processing operations during the interval in which the pixels are being processed by the system.

Figure 8:
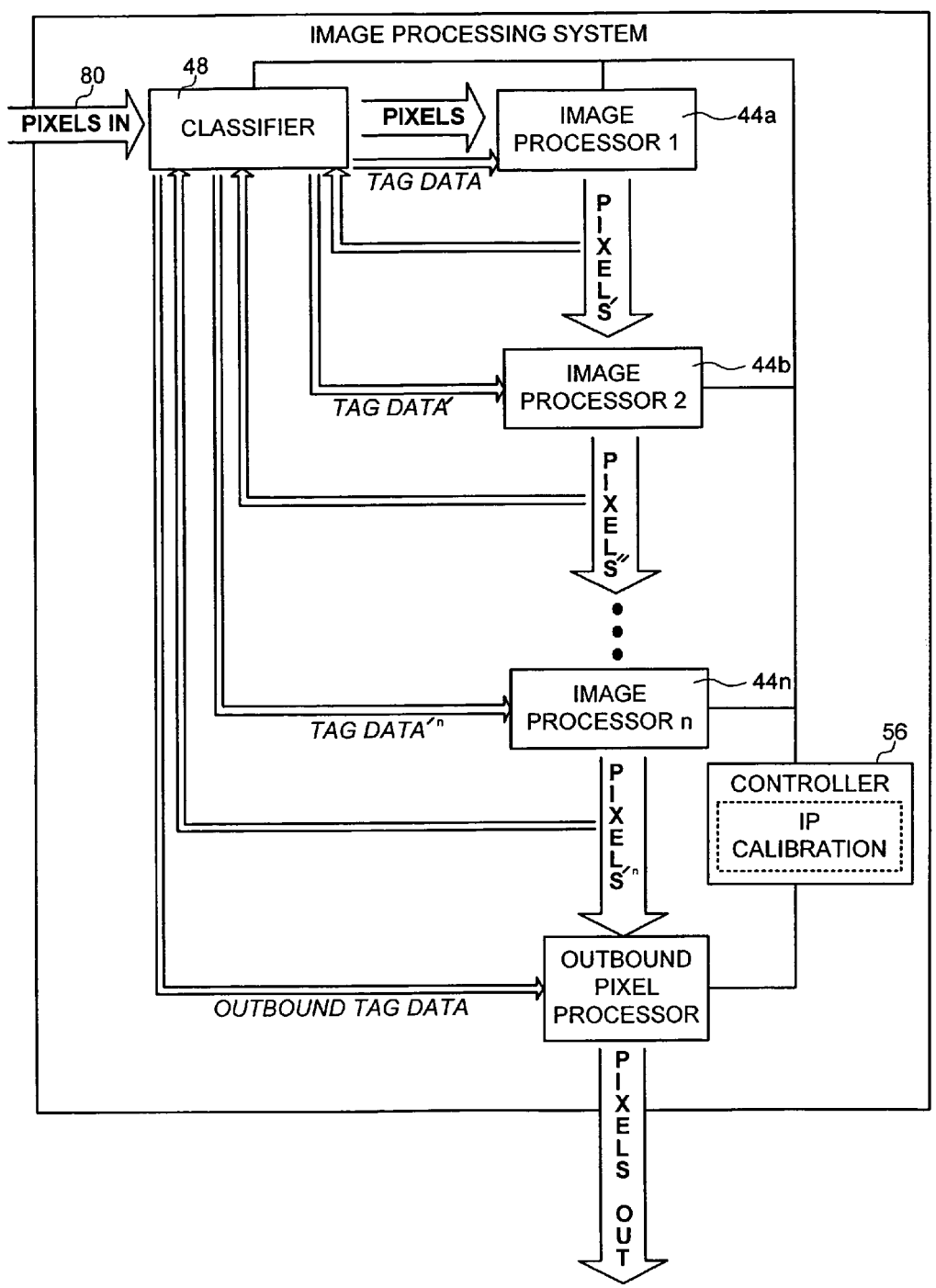
FIG. 8 is a block diagram of an image processing system according to the present description, showing exemplary flows of pixel and associated tag data through the system.

The repeated modification of the pixel and associated tag data may be seen with reference to FIG. 8. The figure shows image processor blocks 44 (embodiments may contain any desired number of blocks/operations 1 through N), and a controller 56 and classifier 48. Input Pixels 80 are first applied to classifier 48, which performs the relevant analysis to obtain Tag Data. The Pixels and Tag Data are then applied to the Image Processor 1, which performs a processing operation and outputs Pixels', which are analyzed by classifier 48 to derive Tag Data'. Typically, the pixels are modified at each of the multiple processor blocks, with the result being a change in the associated tag data, which is monitored and updated by classifier 48.

The pixels and tag data may be associated in any number of ways. In the examples discussed herein, the pixels and tag data both reside in system memory, and are associated via a common memory address/location, pointer, etc. Alternatively, the pixels and tag data may be stored and transmitted together in a data structure. For example, a header or like mechanism may be used to identify or parse the beginning of the data structure within a stream of data. Part of the structure would include the pixel values (e.g., tristimulus RGB values), with other portions of the data structure being encoded with various types of tag data for the pixels.

As indicated above, the dynamically changing tag data may be used to control implementation of the different image processing operations. In particular, the implementation of a given image processing operation may be dynamically tuned according to dynamic tag data. Typically, multiple image processing blocks/operations are controlled by dynamically changing tag data that is associated with the pixels being processed. Also, over time, the implementation of a particular image processing operation in the system changes, due to the constant variation in tag associated with the incoming pixels being received and processed by the processing operation.

Dynamic tuning of the image processing operations may be effected through use of a control input to the processing operation. In typical implementations, the control input for a given processing operation may include the previously discussed tag information associated with different pixels being processed by the system. The pixels to be processed are also applied as inputs to the processing operation, and the modification or other processing of those input pixels is determined in part by the control inputs (e.g., by the tag data).

Figure 9:
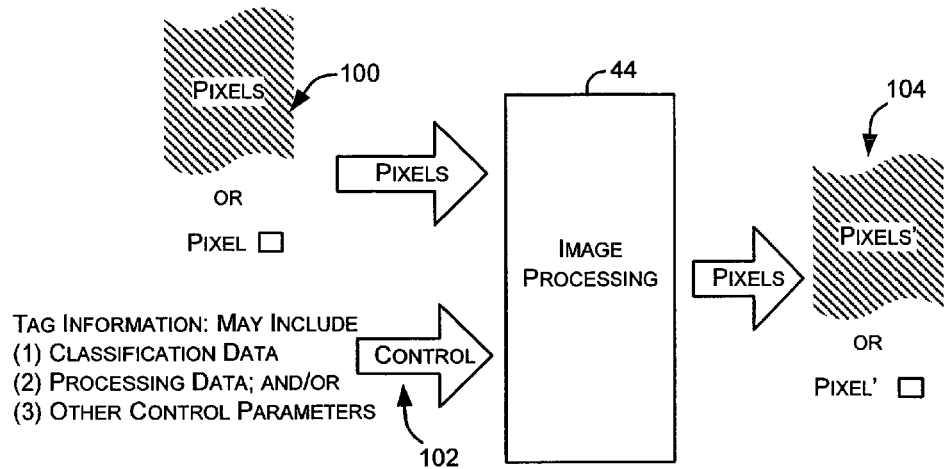
FIG. 9 depicts a system and method in which an image processing operation is dynamically controlled based on dynamically changeable tag information.

Referring now to FIG. 9, processing control at an individual processing block 44 (e.g., a deinterlacing block) will be described. As shown, pixels 100 (or a single pixel) are applied to block 44 to be processed. Block 44 processes pixels 100 according to a control input 102, so as to output processed pixels 104 (pixels'). As indicated, the control effected via input 102 may occur dynamically and be based on a variety of parameters, including the tag information associated with pixels 100. The tag information may include classification data associated with pixels 100 (e.g., motion data, frequency data, etc.), processing information associated with pixels 100 (e.g., filter coefficients employed at another processing step, interpolation techniques used at another step, whether a previous process was tuned to address sharpness issues, etc.), and/or other control parameters. Classification and/or processing data from other blocks (e.g., fed in from downstream or upstream blocks) may also be used to control processing at the instant block 44.

Figure 10:
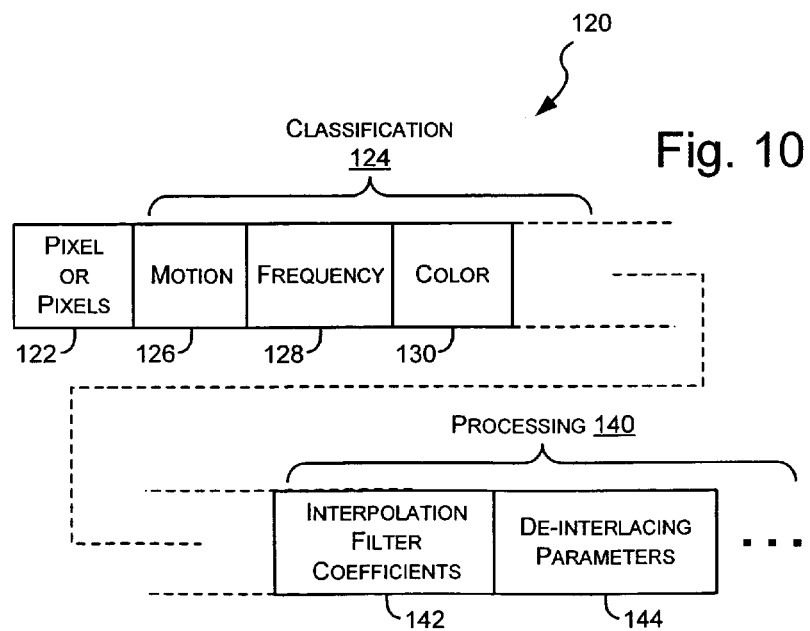
FIG. 10 depicts various types of changeable classification data and processing data that may be associated with a pixel or group of pixels, such tag data being available as an input to an image processing block in order to dynamically tune or otherwise control the image processing operation.

FIG. 10 more specifically shows how tag data, including classification and/or processing data, may be associated with a pixel or pixels. This data may be thought of as a multiple-field class 120, in which various types of data may be associated with pixels being processed in the pipeline. Field 122 indicates the pixels with which the other data fields are associated. Classification data 124 may be associated with the pixels, to describe characteristics or qualities of the pixel or pixels. Classification data 124 may include various types of information, including motion data 126, frequency data 128, color data 130, etc., as previously described. Additionally, or alternatively, class 120 may include processing data 140 to indicate or describe processing that has already been performed on the pixel or pixels. Processing data 140 may include, by way of example, filtering information 142 from another processing block, parameters or methods 144 employed during deinterlacing, etc.

It should be further appreciated that regardless of how the data is organized or correlated, the data for a pixel or pixels may include not only current frame data, but also historical data (e.g., data from prior video frames) for the pixel. Alternatively, the frame buffer or memory may simply store multiple frames worth of data, such that historical data, while not necessarily associated with the pixel being currently processed, is still accessible via accessing system memory. Classification data and/or processing data for prior or even subsequent pixels can be fed in to affect processing at a given processing block. Moreover, the classification and processing data dynamically changes as pixels move through the processing pipeline. This dynamically changing control data may be employed to improve image processing, through the mechanism of dynamically feeding the changing control data forward and/or backward in the processing pipeline. This produces dynamic feed-forward and feedback effects on image processing of other pixels, or on image processing of the same pixels at subsequent processing blocks.

As previously described, the pixels and control inputs may be associated with each other in various ways. For example, the pixels and control data may be transmitted together in a packet-like manner, in which the pixels and tag data are combined in a packet-like data structure having various components. Additionally, or alternatively, the controller and image processing block/operation may retrieve the pixels and tag data from a memory location, via a bus or other interconnection. For example, the components shown in FIG. 2 may all be interconnected via a bus, and an appropriate protocol or other scheme may be employed to manage and negotiate bus communications between the components.

Figure 11:
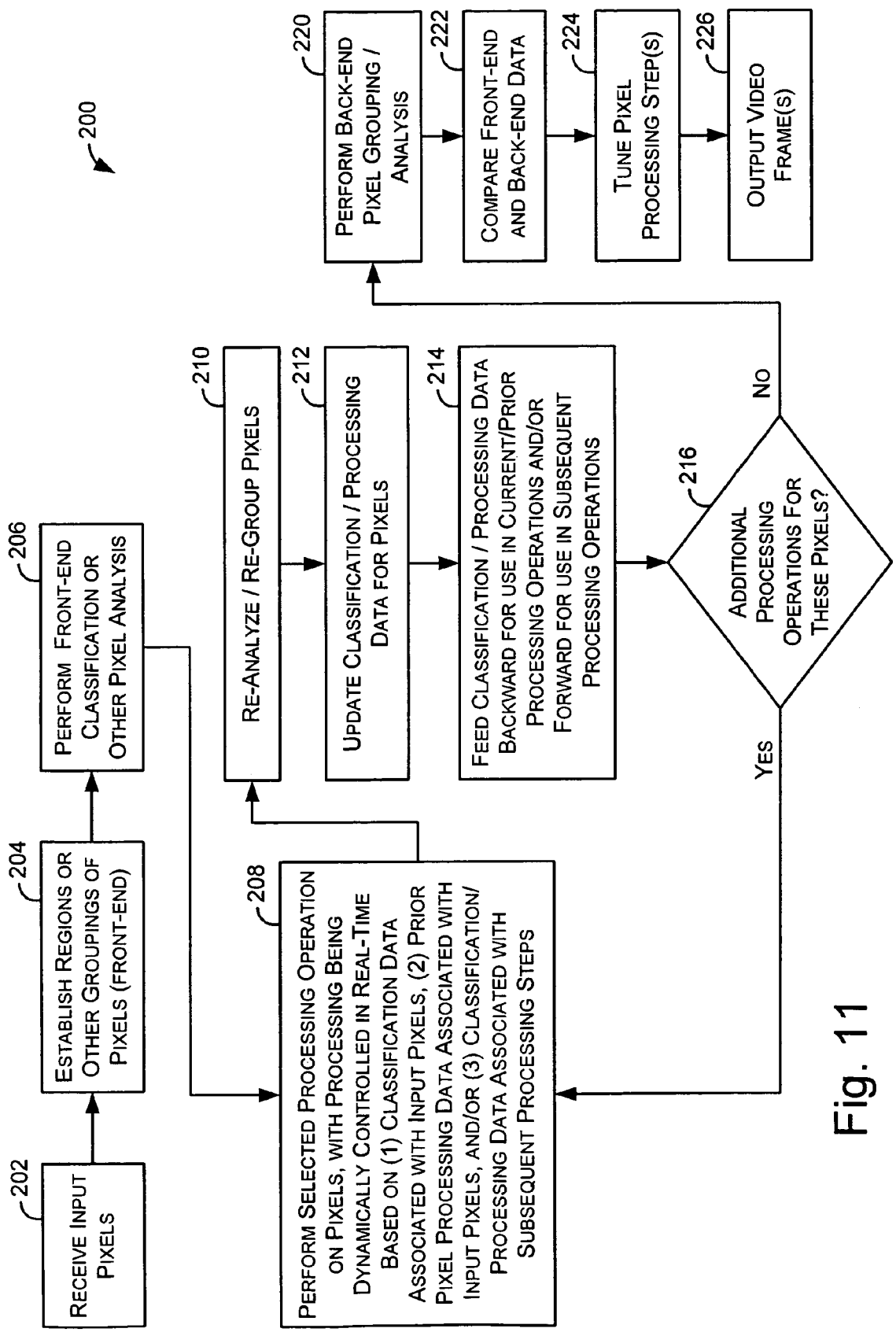
FIG. 11 depicts an exemplary implementation of a method for processing digital images according to the present description.

Turning now to FIG. 11, an exemplary image processing method 200 will be discussed. From the following description, it will be apparent that method 200 may be advantageously implemented in connection with the previously described systems and components. It should be appreciated, however, that the exemplary method, or aspects thereof, may be implemented independently of the particular embodiments discussed herein.

As shown at 202, method 200 may include receiving or otherwise obtaining the input pixels to be processed. This may be accomplished via the previously described analog/digital capture and decode features described above. The received pixels may then be appropriately grouped or regionalized at 204. The pixels may also be analyzed to obtain desired classification data, as shown at 206 (e.g., using classifier 46 and motion estimator 48. Such classification data may include any of the previously discussed pixel classifiers, including motion data, frequency data, color information, gradient data, etc. The grouping and analysis of steps 204 and 206 may be referred to as front-end operations or tasks, because in the present example they are performed prior to any image processing of the pixels (e.g., prior to deinterlacing, image interpolation operations, etc.)

At 208, the method includes performing an image processing operation (e.g., deinterlacing, image interpolation, noise filtering, etc.) on the input pixels. As previously discussed, the processing operation may be dynamically controlled in accordance with classification data and/or processing data associated with the pixels (e.g., classification data 124 and processing data 140 of FIG. 10).

One use of classification data to dynamically tune image processing operations may be understood in the context of deinterlacing. In the present system, the deinterlacing method employed at any given point may be highly dependent upon the degree of motion detected in the pixels to be processed. As previously explained, the motion may be detected by assessing temporal changes for a pixel occurring over plural video frames. This motion information would then be associated with the pixel, for example through use of a multi-field class, such as class 120. The motion information embedded within the class fields would then be used to dynamically control the deinterlacing operation, and/or select the appropriate deinterlacing algorithm. One deinterlacing operation might be appropriate for pixels with a high degree of motion, while another deinterlacing operation (or a modified version of the first operation) might be more appropriate for static pixels or regions of the image.

The processing at step 208 may also be dynamically controlled based on prior processing of the pixels being fed into the processing operation. For example, the associated processing data (e.g., processing data 140) might indicate that certain algorithms had been applied to the pixels that are known to produce blurring effects in the presence of motion. This knowledge could then be used to tune the instant processing operation so as to enhance the sharpness of certain pixels, such as edges of moving objects.

Classification data or processing data associated with other processing operations, or with pixels other than those being processed at step 208, may also be employed to control the image processing operation at step 208. As shown in FIG. 11, after various post processing operation steps (e.g., at 210, 212, 214 and 216), another processing operation may be performed at 210. In the method of FIG. 11, for each pass through step 208, a different processing operation may be performed. For example, a deinterlacing operation might be performed in a first pass, with image interpolation, color processing and noise filtering being performed in subsequent passes.

For a given processing operation, classification data or processing data arising at one of the other processing operations in the pipeline may be employed to affect the processing operation. In a pipeline with deinterlacing, image interpolation and color processing operations, for example, the classification data for output pixels from the image interpolation process may be used to control the deinterlacing processing. In such a setting, analysis of the pixels coming out of the image interpolation process might reveal image quality issues that are best handled by an adjustment to the deinterlacing processing parameters. Processing data may also be fed back or forward through operations in the pipeline. In the above example, processing data from the image interpolation block may reveal repeated use of filter coefficients to improve sharpness. This processing data may be fed forward or backward (upstream or downstream) through the pipeline, so in the event that sharpness can be more effectively handled in other parts of the pipeline, that processing task is shifted to other blocks.

Referring still to FIG. 11, after the selected processing operation, the output pixels from the processing operation may be re-analyzed and/or re-grouped at 210. Typically, classification data for a pixel or pixels changes as a result of the applied processing operation: frequency information may change, gradients may change, motion vectors may be modified, etc. The classification data for a pixel or pixels may then be updated at 212. Additionally, or alternatively, processing information for the pixels may be updated at step 212. Indeed, any classification or processing information associated with the pixels may be updated, for example by updating the relevant fields of a multi-field class such as class 120 (FIG. 10).

From the foregoing description, it should be appreciated that the classification and processing data for a given pixel or pixels dynamically changes as the pixels move through the processing pipeline: pixel characteristics change, different processing parameters and algorithms are applied during processing, etc. This changing classification/processing information can be fed forward and backward through the processing pipeline to dynamically tune the processing operations occurring at any point in the system. Indeed, at step 214, the updated classification/processing information arising from the just-completed processing operation (step 208) is passed to desired portions of the processing pipeline, so as to have potential feed-forward and feedback effects on image processing operations. At 216, if additional processing operations are to be performed on the pixels (e.g., at a downstream block in the processing pipeline), method 200 returns to step 208 to perform the next selected processing operation.

If no additional processing operations are to be performed, a "back-end analysis" and comparison may be performed at 220 and 222. This may involve performing additional analysis to obtain updated classification information for the final output pixels. The results of this back-end analysis may be compared with the front-end data obtained at 204 and 206 in order to further dynamically tune or control any of the processing operations occurring within the processing pipeline. In the context of the exemplary system of FIG. 1, characteristics of the initial input pixels may be compared with classification of pixels comprising the final output video frames in order to assess whether processing objectives were achieved. This comparison would then be used to dynamically tune the processing operations performed by processing blocks 44 in the image processing pipeline, as shown at 224. After processing, the video frames are output as shown at 226.

It will be appreciated that the control inputs to the image processing operations are novel and provide numerous advantages. Use of dynamic tag data that changes and is repeatedly updated during the life of a pixel within the processing system dramatically improves image quality and processing efficiency. Typically, the tag data changes and is updated with each change that is made to the associated pixel or pixels. The dynamic tag data enables the processing at any given point within the system to be responsive to conditions and events occurring/arising in other parts of the image processing system. This eliminates redundant processing and allows for smaller silicon implementations without sacrificing image quality. Indeed, image quality may be significantly improved even with smaller silicon die sizes. Also, the tag architecture and methodology described herein allow for processing implementations to vary from pixel to pixel within a given video frame. In other words, because tag data is obtained and updated for individual pixels, the image processing operations may be varied to a degree of granularity in which a different deinterlacing operation could in theory be applied to every pixel in a video field.

The dynamic tag data of interest (i.e., the input tag data applied to control the processing operation) typically is the tag data that is associated with the pixels that are to be processed by the given processing operation. However, the controlling tag data may be associated with different parts of the processing system or with pixels other than those being processed by the processing operation. For example, in a sequential processing system that successively performs deinterlacing and then scaling, tag information associated with pixels downstream of the scaler may be used to tune the deinterlacing operation. This might occur, for example, if it were determined that the combined operation of the deinterlacer and scaler was unexpectedly producing a certain artifact. The artifact could be discerned in the output of the scaler, and a dynamic correction could be made in the implementation of the deinterlacing process.

Figure 12:
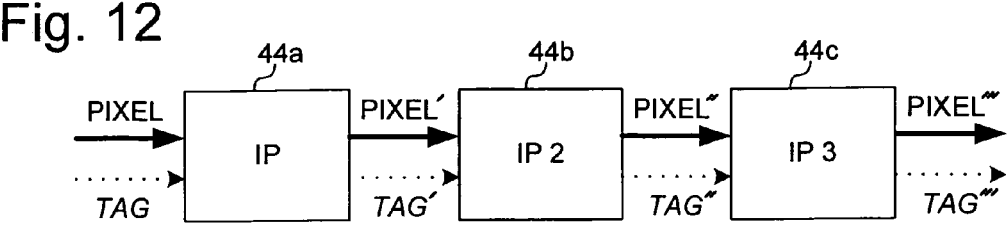
FIGS. 12-15 schematically depict various topological alternatives for pixel and tag data flows in a pipeline processing configuration having multiple image processing operations.

Referring now to FIGS. 12-15, various processing modes will be illustrated. In certain embodiments, use of these modes is facilitated through use of bus-type topologies and through sharing of tag data and other data between the different processing operations of the system. Referring first to FIG. 12, a sequential pipeline mode of operation is depicted, in which pixels and tag data are applied in sequence to a serial arrangement of multiple image processing blocks/operations 44. Specifically, Pixels and Tag Data are applied to block/operation 44a, which outputs Pixels' and Tag Data' for input to block/operation 44b, and so on, with the ultimate pipeline output being output by block/operation 44c.

Figure 13:
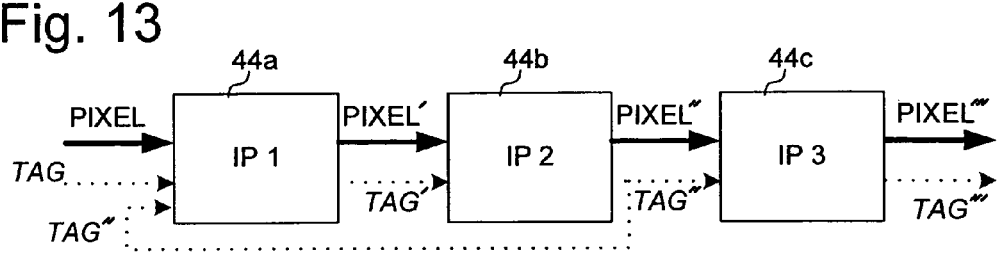

FIG. 13 depicts a mode in which pixels are sequentially processed in the pipeline fashion of FIG. 12, but with tag data being obtained other than just via the pipeline scheme. Specifically, the tag output of one of the blocks/operations (e.g., block/operation 44b), is provided to a block/operation other than just the next block/operation in the pipeline pixel processing sequence. Specifically, in the depicted example, Tag Data" from block/operation 44b is provided upstream (i.e., to an earlier block in the pipeline pixel processing sequence) to be used as a control input to block/operation 44a. In addition to, or instead of, upstream transmission, tag data for a given block/operation may be provided downstream to a block other than the next block in the pixel processing sequence.

Figure 14:
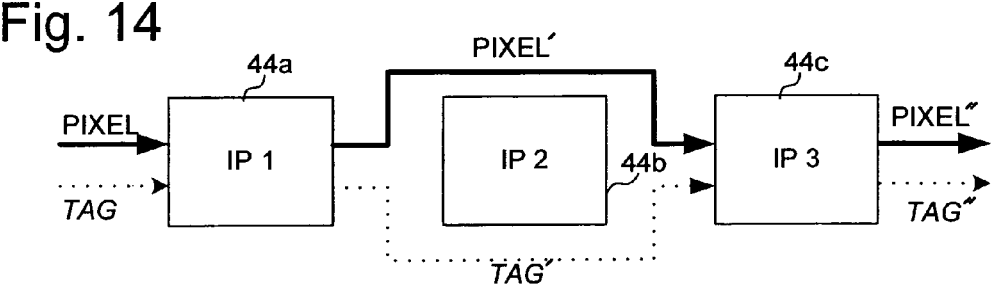

In some cases, it will be desirable to vary the processing sequence for the pixels and/or altogether bypass or exclude certain image processing operations. Referring to FIG. 14, it will be seen that the exemplary systems herein may be operated so as to allow pixels and/or tag data to be dynamically routed to locations other than the next sequential processing block/operation. In the depicted example, block/operation 44b is being bypassed, with the pixels passing straight from the output of block/operation 44a to become the inputs of block 44c. This may be selectively performed with respect to only certain portions of the video signal, or to certain pixels within a video frame, and such selective rerouting may be dynamically based on tag data associated with the pixels being processed. For example, based on the tag data, it may be determined that certain pixels of a video frame do not need to be sharpened. In a system with a processing block that was substantially devoted to sharpness control, that block could be bypassed for the pixels that do need to be sharpened. By eliminating such unnecessary processing, efficiency is increased and processing resources are preserved for critical processing tasks.

Figure 15:
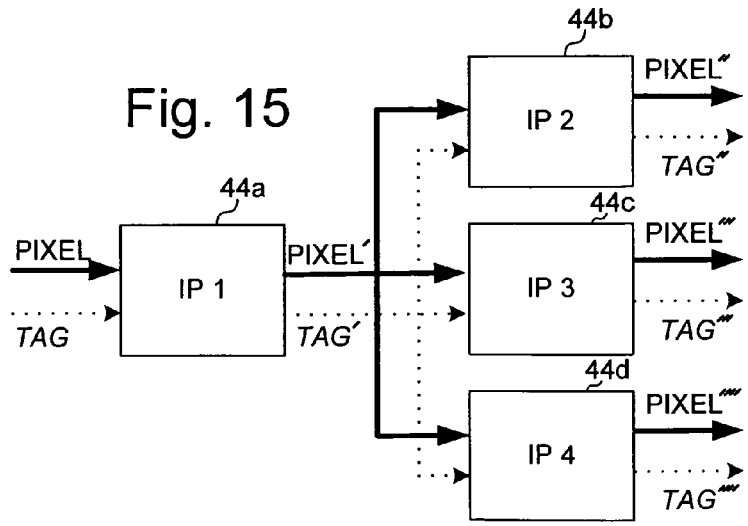

FIG. 15 depicts what may be referred to as a broadcast or multicast mode of operation, in which pixels and/or tag data output from a processing block/operation is provided as an input to more than one processing block/operation.

Continuing with the examples of FIGS. 12-15, it will be appreciated that use of a configuration such as that shown in FIG. 2A (e.g., a bus configuration) may provide significant flexibility in routing of pixel and tag data flows. Furthermore, the exemplary configuration enables pixel data (e.g., frame data F1, F2, etc.) and its associated tag data (T1, T2, etc.) to be accessed by any system component at any point during processing operations. Accordingly, any of the pixel or tag data in memory 58 may be employed to dynamically control the pixel processing operations/stages 44a, 44b, etc.

Typical embodiments of the described image processing system and method include deinterlacing, image interpolation and color processing operations. These operations may be performed sequentially in a processing pipeline, as schematically depicted above with reference to FIG. 12 and other figures. As previously discussed, input pixels are applied to each block, and the relevant processing operation is dynamically controlled based on classification information and/or processing information, which typically changes as the pixels are processed and move through the processing pipeline.

As previously discussed, typical embodiments of the described system and method include a deinterlacing block or processing operation. Many video signals are commonly provided in an interlaced format, in which every other horizontal line of an image scene is scanned and transmitted for a given video frame. Even- and odd-numbered scan lines are presented in an alternating succession of video frames. As a result, in a system in which sixty video frames per second are displayed, video frames containing the even-numbered lines are displayed thirty times and video frames containing the odd-numbered lines are displayed thirty times. In such an interlaced signal, a given video frame only contains 50% vertical resolution.

Referring to FIG. 16, operation of an exemplary deinterlacing block will be described, in which interlaced video frames are converted into a signal having full vertical resolution. Frames 260 and 262 are video frames of an interlaced video signal. As indicated, frame 262 may be referred to as the current frame, while frame 260 may be referred to as the previous frame. Each frame contains a plurality of pixels denoted with the legend {row, column}, indicating the row and column position of the pixels within the frame.

To construct frames having full vertical resolution, various methods may be employed. The missing rows of a current frame may simply be obtained and added in from a previous frame in a method known as field meshing. Meshing can provide high quality deinterlaced images, particularly when the pixels involved are static or exhibit a low degree of motion. Additionally, or alternatively, various types of interpolation may be employed, in which a target pixel is interpolated based on properties of one or more neighboring pixels. For example, the missing pixel {2,2} of current frame 262 may be interpolated by averaging or otherwise interpolating properties (e.g., brightness, hue, saturation, etc.) of neighboring pixels {1,2} and {3,2}, or of a larger set of adjacent pixels, such as pixels {1,1}, {1,2}, {1,3}, {3,1}, {3,2} and {3,3}.

FIG. 17 depicts an exemplary deinterlacing block 280 according to the present description, which may be configured to receive input pixels 282, perform a deinterlacing operation upon the pixels based upon an applied control signal 284, and output processed pixels 286 in a deinterlaced format.

Similar to the processing block described with reference to FIG. 9, the specific processing operation or methods being performed by block 280 (e.g., deinterlacing) may be dynamically varied in real-time according to tag information such as classification and/or processing data associated with the input pixels 282. Additionally, or alternatively, classification and/or processing data associated with pixels other than pixels 282, or with other processing blocks in the pipeline, may be used to dynamically vary the deinterlacing operation. For example, selecting between field meshing and interpolation methods to reconstruct missing pixels may be determined to a large extent by motion classification data. Meshing may be undesirable for moving pixels, as meshing can create a "tearing" or "feathering" effect, due to the temporal shifts occurring between successive interlaced video frames. Interpolation may be more desirable for pixels having a high degree of motion.

In contrast, static or relatively static images may lend themselves more readily to deinterlacing using a non-interpolative method, such as field meshing. Meshing in some instances can produce sharper images, and may thus be preferable for deinterlacing low motion images. The exemplary block 280 is configured to not only select between interpolative and non-interpolative methods, but to blend the methods with desired weighting where appropriate, based on classification and/or processing data or other parameters embedded within control signal 284. In the depicted example, the control signal can cause deployment of a pure meshing method, a purely interpolative method, or any blending of those two extremes.

It should be understood that any number of deinterlacing implementations may be selected or selectively combined based on classification data and/or processing data, including field mixing with a FIR filter, use of a median filter, line doubling, use of vertical temporal filters, averaging filters, etc. Generalizing to a deinterlacing processing block with N alternate deinterlacing methods or algorithms, the present system may be employed to combine or cross-fade between the alternate methods in any desired way, based on the rich control data available in the processing data and/or classification data. Some of the alternate methods may be weighted or emphasized more heavily than others, one particular method may be selected to the exclusion of others, etc. In other words, the classification data and/or processing data may be used to control the extent to which each available deinterlacing method participates in the deinterlacing process to produce a target pixel or pixels.

The example of FIG. 17 may be used to illustrate how classification data and processing data may be fed forward and/or backward to dynamically tune processing in real-time. Assume that input pixels 282 are from a particular region of a video frame, and that classification data associated with pixels 282 indicates a high degree of motion in that portion of the video frame. The processing at deinterlacing block 282 could then be dynamically adjusted to construct full vertical resolution using a method weighted more heavily toward interpolation, perhaps even a purely interpolative method, in order to avoid feathering or other unwanted artifacts.

As previously discussed, interpolative deinterlacing methods can cause blurring effects or other loss of sharpness. Continuing with the above example, if a loss of sharpness were to occur due to use interpolation during deinterlacing, that would be reflected in the classification data obtained for the output pixels (e.g., by analysis/classification block 46 of FIG. 2). The associated classification data would flow downstream to the next processing block, which would factor in the lack of sharpness in tuning its processing algorithm. In alternate embodiments classification data may be sent upstream.

Additionally, or alternatively, information about the deinterlacing operation itself could be reported upstream or downstream. In the present example, the reported processing information would indicate that a highly interpolative method was used for deinterlacing. Other processing operations could be dynamically tuned in response to compensate for potential sharpness loss resulting from the deinterlacing operation.

Classification and/or processing data may also be fed upstream or downstream to control processing blocks or operations that vary the resolution of input pixels (image interpolation). Resolution changes may be applied differently to different regions of the input video frame, and may include reduction in resolution and/or increases in resolution (upconversion). The methods employed to vary the resolution may be dynamically controlled based on the input classification and/or processing data. Typically, the dynamic control causes dynamic variation of image scaling coefficients used to derive target pixels. The dynamic control of the coefficients may be employed whether the image is being scaled up or down, and may further be employed in connection with linear and non-linear methods.

For example, upconversion may be accomplished by sampling the input pixels, and applying the sampled values to a new larger grid of pixels. This process can involve pixel replication using "nearest neighbor" methods, though interpolation will commonly be employed. One common method is a cubic convoluting interpolation method, employing a multiple coefficient filter. Referring to FIG. 18, a grid of pixels is shown. At the center of the grid is a target pixel whose value is to be determined. Interpolative methods may determine this pixel by assessing the values of neighboring pixels. The value of a neighboring pixel may be taken into account, as well as its distance from the target pixel.

Indeed, cubic convoluting interpolation involves interpolating based on four known pixels. For example, in the horizontal direction in FIG. 18, the target pixel may be interpolated from the values of known pixels {2,0}, {2,1}, {2,3} and {2,4}, taking into account the values of the known pixels and their distances from the target pixel. Image scaling coefficients may also be employed, to more heavily weight certain pixels and to filter out noise or other high frequency artifacts in the upconverted image. The interpolation methods typically are applied in both the horizontal and vertical directions to determine values of target pixels.

Classification data and processing data associated with the pixels, or from other sources, may be used to dynamically tune the image interpolation methods. Interpolation coefficients may be determined according to or based on motion, gradient and/or frequency information associated with the input pixels. If prior processing algorithms have provided sub-optimal sharpness enhancement, filter coefficients may be selected for image interpolation to preserve or enhance sharpness in portions of the image.

It will be appreciated that the dynamic control and feed-forward and feedback features discussed herein are equally applicable to color processing and other image processing operations. In the context of color processing, the changing classification and processing data associated with input pixels can be used to control, adjust or select algorithms used to vary brightness, contrast, hue, saturation, color space conversions, etc., of the input pixels. Overall brightness of pixels may be reduced in response to motion information for a pixel. Motion history for a pixel or pixels may be used to identify and correct artifacts associated with occlusion problems. In addition to, or instead of, basing control on data associated with the input pixels, control may be based on classification or processing data fed in from other portions of the processing pipeline (via feedback or feed-forward configurations).

Figure 19:
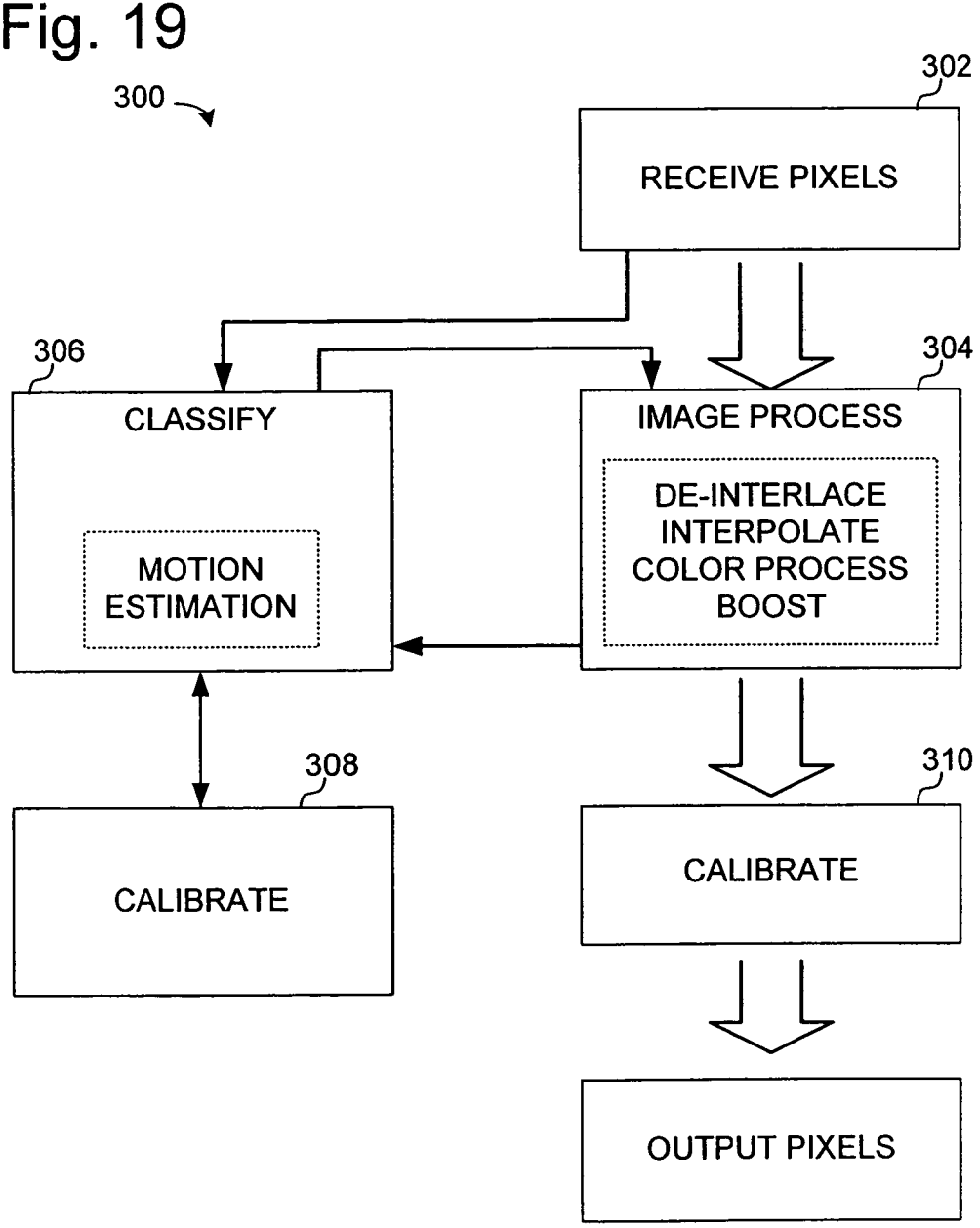
FIG. 19 depicts an exemplary method for processing pixels according to the present description, including steps for calibrating analysis/classification and processing operations.

As discussed above, multiple different processing operations may be dynamically tuned using the changeable tag data described herein. FIG. 19 depicts another implementation of a dynamically tuned method 300 for processing pixels of a video signal. At 302, the method includes receiving digital video in the form of a pixel or pixels. At 304, the method includes performing multiple image processing operations on the pixels, which may include deinterlacing, image interpolation (e.g., to achieve upscaling or downscaling), color processing, boosting, etc. The method may also include, at 306, performing a classification of the pixels being processed, in order to obtain associated tag data such as motion information, spatial frequencies, color information, etc.

The classification indicated at 306 may be performed at any time prior to or during execution of the multiple image processing operations available at step 304. In typical implementations of the method, an initial classification is performed prior to any image processing, in order to obtain initial tag data that acts as a control input to the first image processing operation. In addition, classification typically is performed after each processing operation, in order to update the tag information associated with the pixels, as the tag information will change as the pixels are modified by the processing operations.

Accordingly, it will be seen that the class data is continuously updated and used to tune/control the processing operations so that each operation is optimally tuned to perform optimal efficient processing on the pixels based on the dynamically updated tag information associated with the pixels. As explained in detail below, method 300 may also include calibration of the classification and image processing implementations (steps 308 and 310).

Dynamically tuning the different processing operations based on changing tag data can be employed to advantage in many different settings. In a first class of examples, tag information relating to image sharpness can be used to dynamically control multiple processing operations so as to enhance processing efficiency and image quality. As is known in the art, pixel characteristics related to image sharpness are often changed significantly by image processing operations. Deinterlacing operations, for example, can have a significant effect on sharpness. In a series of video frames having significant motion, the motion information (e.g., a type of tag information) associated with the pixels might lead to dynamic selection of an interpolative deinterlacing operation, instead of a non-interpolative method involving simplistic combinations of even and odd video fields.

Depending on the nature of the underlying motion, the particular interpolative deinterlacing method might introduce a degree of blurriness into the image. Such blurriness might be desirable, to avoid enhancing low angle artifacts or other undesirable effects. The blurriness, or the properties or processing that lead to the introduction of the blurriness, could be communicated to other processing operations in the system (e.g., a scalar, color processor, etc.), so that those operations could appropriately compensate for or otherwise respond to the deinterlacing operation.

Tag information pertaining to pixel location may be used to dynamically tune image processing. For example, it is known in the art that a viewer's attention is often directly more strongly to central areas of a displayed image. Accordingly, the implementation of a given image processing operation may be tuned according to the location of the subject pixel within the video frame. Sharpness controls, for example, might be more aggressively applied in central regions of the video field.

In another example involving a deinterlacer and scalar, the video coming into the deinterlacer might include low angle lines and edges moving horizontally within the video frame. As is known in the art, these conditions pose special challenges in a deinterlacing operation. In particular, low angle motion very often results in jagginess and other undesirable artifacts.

In the present exemplary embodiments, the low angle motion would be detected by classifier 46 (FIG. 2) and reflected in the generated tag information 52 (FIG. 3). The pixels and tag information would be applied to the deinterlacing operation, the implementation of which would be controlled in part by low angle characteristics in the incoming tag information. Based on the tag information control input, a deinterlacing implementation would be dynamically selected that was appropriate to addressing low angle motion, so as to reduce jagged edges and otherwise optimize the processing operation.

A deinterlacing implementation configured to minimize jaggies and pixellation in frames with low angle motion will typically produce a slight blurring in the output pixels or other reduction in sharpness. As previously discussed, the present system involves heightened interdependence and interaction between the different image processing operations. In the present example, this interdependence/interaction may include a variation or modification of the scaling process based on the low degree of sharpness in the deinterlacer output. Specifically, the system may be configured so that the scalar responds to the lack of sharpness by dynamically selecting a set of scalar coefficients that compensate by increasing image sharpness.

There are many different ways that subsequent processing operations can be tuned based on the lack of sharpness in the present example. In many embodiments, the pixels output from the deinterlacing operation are re-analyzed (e.g., by classifier 46) to update the tag information associated with the pixels. The tag information could include information pertaining to the sharpness of the associated pixels. In the present example, the tag information downstream of the deinterlacer would indicate a low degree of sharpness. The system could then dynamically respond to this portion of the tag information by responsively and dynamically selecting a scalar implementation that accounts and compensates for the lack of sharpness existing immediately downstream of the deinterlacer.

In other embodiments, the tag information may include direct information about the processing operation performed by the deinterlacer. Specifically, the associated tag information would include an indication of the specific deinterlacing implementation that was performed on the pixels. The system may be adapted so that the scalar operation, when confronted with pixels that had been processed using a given deinterlacing implementation, would respond by tuning its own processing to complement the deinterlacing operation, e.g., to specifically address the sharpness effects of the selected deinterlacing implementation.

Figure 20:
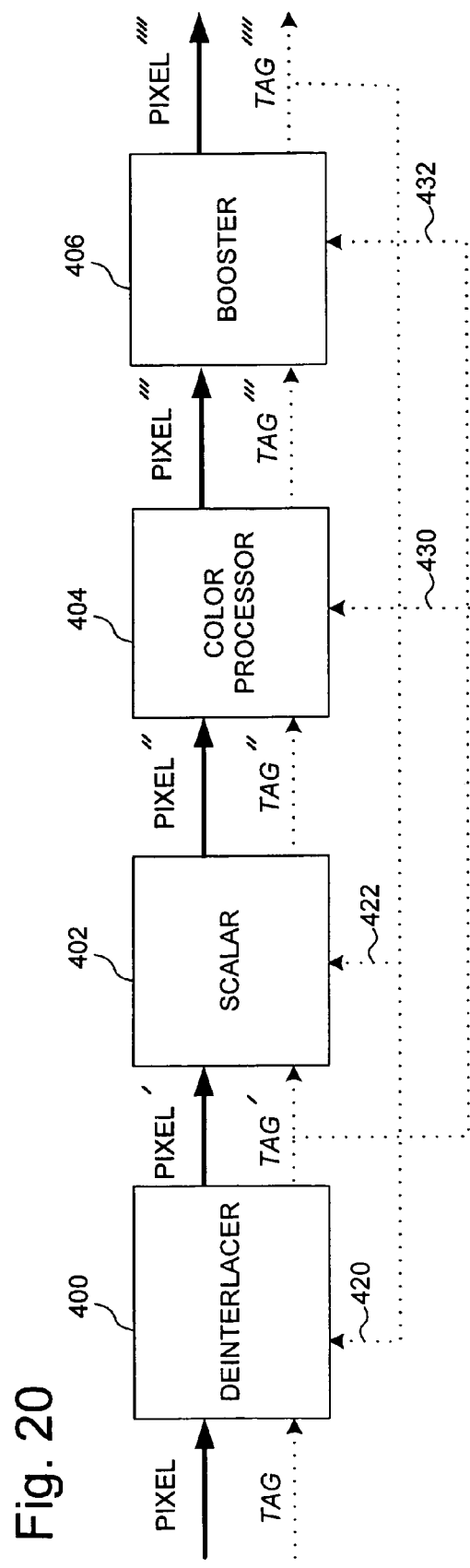
FIG. 20 schematically depicts a further topological alternative for pixel and tag data flows in a pixel processing pipeline having multiple processing operations.

It will be further appreciated that the tag control input to the scalar may include information other than information which directly pertains to the incoming pixels to be processed by the scalar. This may be seen in FIG. 20 by extending the above example to include not only a deinterlacer 400 and scalar 402, but also processing operations for color processing (block 404) and boosting (block 406), with the color processor 404 and booster 406 being coupled in serial pipeline fashion downstream of the scalar (FIG. 20). As previously explained, in such a serial configuration, initial input pixels are applied to deinterlacer 400, with modified output pixels being applied to scalar 402, and then successively to the color processor 404 and booster 406.

The dynamically changing tag information may of course be fed forward in a serial pipeline manner, similar to the pixels. However, in addition to, or instead of such a topology, tag control information may be received at the scalar (or at any of the other blocks) from a source other than the incoming pixels. For example, a back-end analysis of the ultimate pipeline output may be used to dynamically tune processing, in which tag data associated with output pixels from the last pipeline block is fed back to control one or more upstream blocks. Specifically, tag data arising immediately downstream of booster 406 may be used to dynamically tune the deinterlacer 400 (via feedback 420), scalar (via feedback 422), and/or color processor (via feedback 424). Alternatively, output tag data from any processing blocks may be used to tune processing at downstream blocks other than the immediately adjacent downstream block. Specifically, for example, tag data arising immediately downstream of the deinterlacer 400 be used to tune processing at the color processor 404 (via feedforward 430) and/or booster 406 (via feedforward 432).

Referring again to FIG. 2A, various additional examples of tag-based dynamic control will be explained. The arrows between the image processing operators 44a, 44b, 44c etc. are intended to indicate one of many possible pixel data flows or order of operations. For example, the pixels of frame F3 could be processed first by operator 44a, then by 44b, then by 44c, etc. Unless otherwise indicated, it will be assumed in the examples that operator 44a is a deinterlacer, 44b is an image scalar (e.g., via subsampling or supersampling) and 44c is a color processor. It will be further assumed that the multiple frames of video data have been received into and move through the system in a FIFO manner, beginning with frame F1, and that the frames are processed first by deinterlacer 44a, then by scalar 44b, and then by color processor 44c. Additional processing operations up through IPn may also be performed (filters, noise reduction, boosting, etc.).

In a first example, motion information (e.g., motion vectors) is obtained for each of the frames and incorporated into the tag information. This motion information is used, for each frame, to dynamically control the deinterlacing operation that is performed on the frame. The frames move serially through the motion estimation analysis and deinterlacing operation, and then serially into the scalar for scaling processing. Coming out of the deinterlacer, the frames are analyzed by classifier 46 to create and/or update low angle information in the tag data for the pixels. At the scalar, a threshold may be established corresponding to the ability of the scalar to tolerate or accommodate low angle information. If the threshold is exceeded, the deinterlacing operation may be dynamically controlled (e.g., a different deinterlacing algorithm may be employed) to address the low angle issue. Additionally, or alternatively, the motion estimator 48 may be dynamically tuned (e.g., a different motion estimation method may be employed) to vary the nature of the motion information being fed to the deinterlacer, which in turn would affect the deinterlacing operation, with an eye toward bringing the low angle information within the range required by the scalar.

In another example, classifier 46 performs an initial front-end classification which is used to preset various image processing settings for multiple operators 44a, 44b, etc. Once a frame or frames have moved through one or more of the operators that have been preset, the resulting downstream pixels (or the associated tag data) may be analyzed to assess the efficiency or quality of the initial front-end classification or presets. For example, classifier may make an initial determination or inference about the motion present in a frame and, based on that determination/inference, preconfigure the deinterlacer and scalar. If the ultimate output pixels exhibit artifacts or other undesirable properties, the classifier can be tuned to not repeat the same reconfiguration for subsequent frames.

In a further example, assume it has been established in the tag data or elsewhere that the display device is a plasma screen television. In many cases, such a display device exhibits slower response time characteristics than a cathode ray tube display. Based on this knowledge, which can be embedded within frame tag data, one or more of the processing operators may be tuned or dynamically controlled to look at tag data for upstream pixel so as to make early processing adjustments to account for the slower response time of the pixel elements in the display. For example, sharpness controls in the scalar 44b may be dynamically controlled based on a plurality of upstream frames, so that the sharpness adjustments may be initiated at an earlier time to account for the response characteristics of the display.

It should be apparent from the present discussion that image processing needs vary substantially, depending on the characteristics of the video signal and the particular processing operation being performed. Indeed, processing needs can vary significantly from pixel to pixel within a particular image, which the present system is adapted to handle by applying different processing implementations on a per pixel basis.

Accordingly, it will typically be desirable to configure the temporal characteristics of the system to accommodate the variable processing needs of a given video signal. Assuming a certain overall processing delay (i.e., the processing interval between the system receiving an input video frame and outputting the corresponding output frame) and an input frame rate, it will be appreciated that the system acts in a FIFO manner, with a certain number of video frames being resident in memory at any given time, with each frame residing in the system for a time equal to the overall processing delay.

As shown in FIG. 21, in typical prior systems, rigid allocations are employed in which only a certain fixed amount of processing time or processing resources are devoted to a task. In the figure, blocks 500, 502, 504 and 506 each represent different processing operations. In prior systems, the time/resources allocated for each operation is not necessarily equal, but the allocation is determined ahead of time and is fixed. Given a first series of video frames requiring a simplistic deinterlace and a relatively complicated scaling operation, the prior systems would treat these frames, from a processing resource allocation perspective, no differently than a series of frames that are computationally expensive to deinterlace and inexpensive to scale.

Furthermore, as discussed above, prior systems commonly suffer from functional and physical redundancies occurring between the different processing operations of the system. Such a redundancy is schematically illustrated in FIGS. 21 and 22 by redundant subsystem 520, which may be a common logic circuit, sequence of operations, etc. Using the previously cited example, subsystem 520 may correspond to a motion estimation system built into and provided dedicated motion functionality to each of the processing blocks 500, 502, 504 and 506.

The dynamic tag architecture and other features discussed herein enable a previously-unavailable level of integration and interaction between the different processing operations. As seen in FIGS. 23 and 24, this integration allows elimination of the redundant subsystems 520 in favor of a shared functional element 520a. The shared subsystem 520a (e.g., a motion estimator) may then be used for all of the blocks. The motion estimation may be performed once, as in the example of FIG. 23, or the motion estimator block may be repeatedly consulted by the system (as in the earlier example) in order to update tag data pertaining to motion between each of the image processing operations. In any case, it will be appreciated from FIG. 24 that the integration made possible through the dynamic tag architecture allows for an overall reduction in die size of a silicon embodiment of the system, if only because motion estimation blocks are not replicated in the present example. Furthermore, as discussed above, the shared motion block provides a consistent view of tracking motion throughout the system.

In addition, the dynamic tag architecture provides a level of interaction among system components that enables more efficient use of processing resources. Tag information might indicate, for example, that a series of frames exhibited a relatively low degree of motion. In many cases, low motion video is computationally less expensive to deinterlace. Accordingly, the present system is configured to respond to such a condition by re-allocating processing resources (e.g., processing time) from one operation to another (e.g., from deinterlacing to scaling). This may be seen with reference to FIG. 23, in which processing time has been re-allocated from operations 500 and 502 for use by operations 504 and 506.

Re-allocations of processing time may also be made from one pixel to another pixel, from a group of pixels to another group of pixels, from one video frame to another frame resident in memory, etc.

As discussed above, each image processing operation may be implemented in many different ways. A given processing operation might be implemented using any number of different algorithms or routines. A given algorithm or routine might have a number of adjustable parameters, coefficients, constants, etc. In certain settings, it may be desirable to limit the number of available alternatives when dynamically tuning processing in real time. Limiting the available implementations may allow simplification of the process by which a particular processing implementation is selected.

Assume, for example, that an image processing system is capable of running $2^{20}$ different implementations of a deinterlacing operation, taking into account several different deinterlacing algorithms and the tunable parameters/constants for each algorithm. The dynamic tag information discussed above may be employed in a dynamic processing decision about which of the $2^{20}$ different implementations to use. This processing decision, however, can be fairly complex and computationally expensive, given the large number of implementation choices.

Accordingly, it will at times be desirable to set aside a limited number of implementations, culled from the larger set of potential implementations, and then select from those during the dynamic tag-controlled processing. Selections and allocation may be made based on accessibility/access time for different storage locations of the processing implementations. For example, a master set of deinterlacing implementations may be stored in non-volatile storage having a relatively slow access time. A much smaller set of deinterlacing implementations (e.g., eight) could then be loaded into a storage medium having a substantially faster access time, such as a DDR memory module. During operation, the tag information could be used to dynamically control processing, by selecting from the eight deinterlacing operations for each processing pass.

Figure 25:
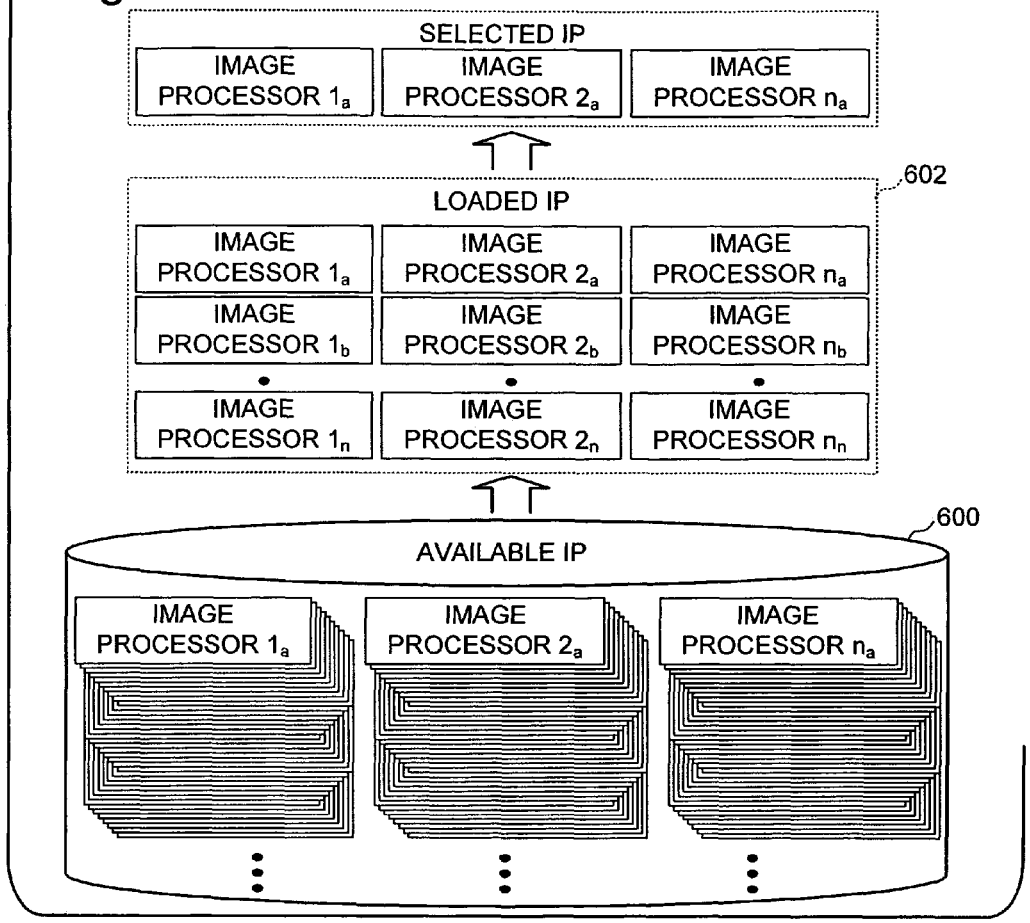

Such an arrangement is illustrated in the exemplary schematic of FIG. 25. Database 600 includes multiple implementations a through n for each of three different image processing operations: (2) Image Processor 1; (2) Image Processor 2; and (3) Image Processor 3. Image Processor 1 could be for example, a deinterlacing operation, with implementation $1_a$ being a field meshing method, $1_b$ being a first interpolative deinterlacing method, etc. Image Processor $2_a$ through $2_n$ could be various implementations of a scaling process, Image Processor $3_a$ through $3_n$ could be various implementations of a noise filter, etc.

The master set of database 600 may be referred to as "available" image processing implementations. Furthermore, a smaller set of these implementations may be referred to as "loaded" image processing operations, which are loaded and stored in a location 602 that is typically more readily accessible (e.g., faster access times) during operation of the image processing system. Then, during operation of the system, the loaded image processing implementations are dynamically selected (e.g., based on the dynamically updated tag data) to perform pixel processing operations on video flowing through the system.

Figure 26:
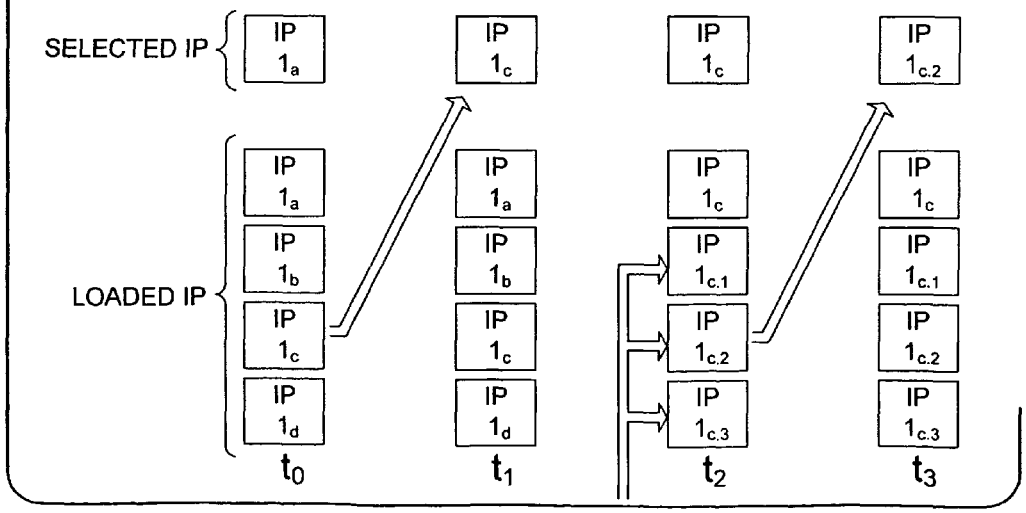

FIGS. 26 and 27 illustrate a method of dynamically tuning an image processing operation. Referring first to FIG. 26, it will be seen that at time $t_0$, implementations $1_a, 1_b, 1_c$ and $1_d$ of Image Process Operation 1 are loaded (e.g., into a DDR module) and ready to be dynamically selected for use. This corresponds to step 700 in FIG. 27, in which desired implementations of a processing operation are loaded and readied for use.

The selection of the loaded implementations may be effected in various ways. For example, the -system may be configured to load various preset deinterlacing implementations at startup. Alternatively, after a number of video frames have been processed, a number of implementations may be selected based on characteristics of the video frames that have been processed. In particular, if the tag information for the processed frames indicates a high degree of motion, the system may be configured to select and load deinterlacing implementations more geared toward dealing with a high degree of motion.

In any case, once a number of implementations are loaded and readied for use, the implementations are then dynamically selected and applied to process pixels during operation, as shown at step 702. As previously discussed, the dynamic tag data associated with the pixels being processed may be used to dynamically tune the processing operations, by selecting from the loaded processing implementations. Referring now to step 704, monitoring is performed to determine whether any changes should be made to the loaded processing implementations.

Various things may be monitored to determine whether changes should be made to the loaded processing implementations. With respect to a deinterlacing operation, an initial loaded set of implementations might span a wide range of anticipated pixel motion. For example, the initial set might include two implementations geared to a high degree of motion, two implementations geared to a low degree of motion, and four implementations designed to address deinterlacing of very low motion fields.

A first thing that may be monitored is statistical usage of the implementations themselves. For example, referring to FIG. 26, let implementation $1_c$ represent a deinterlacing implementation keyed to handle very high motion. Assume further, that for a given interval (e.g., spanning from time $t_0$ until just prior to time $t_2$), that implementation $1_c$ had been applied much more frequently than the other loaded implementations, say 90% of the time. As shown at step 706, the system may be configured to dynamically vary the loaded implementations based on such a monitored observation of usage. Indeed, at time $t_2$ (FIG. 26), the relatively unused implementations $1_a$, $1_b$ and $1_d$ have been swapped out in favor of implementations $1_{c.1}$, $1_{c.2}$ and $1_{c.3}$, which are more similar to the heavily used implementation $1_c$.

Additionally, or alternatively, the tag data associated with the processed video may be directly monitored in order to dynamically select the processing implementations that are to be loaded into the more readily-accessible memory location. For example, tag data may reveal video frames exhibiting regions with very high spatial frequencies and sharply delineated edges in the center of the video frame. Based on this, scaling implementations (e.g., filter coefficient sets) may be loaded into memory that are geared toward preserving edge features and sharpness. In the context of color processing, tag information or other monitored information may reveal that the processed video is skewed toward a particular color range.

The tuning and adjustment of the loaded implementations may be referred to as calibration, and typically dynamically occurs during operation of the image processing system. Calibration typically involves a regular incremental shifting of loaded implementations (e.g., unloading unused or undesirable implementations and replacing them with more appropriate implementations), such that, over time, the loaded implementations will tend to approximate an optimal set of implementation choices. However, it should be understood that calibration may include not only small incremental changes to the loaded set of implementations, but also a rapid wholesale replacement of all loaded implementations if appropriate under a given set of conditions. As seen in FIG. 19, calibration may be performed on classification methods (e.g., motion estimation techniques), in addition to the pixel manipulation operations.

A further example of calibration may be understood in the context of a color processing operation. In a dark or dimly lit sequence, an uncalibrated color processor might produce unsatisfactory output, in which it is hard for the user to distinguish subtle differences between dark shades. However, with calibration, the observed color range may be used to shift the loaded color processing implementations toward a loaded set more geared to preserving contrast and other detail present in dark images.

The systems and methods described herein may be used advantageously to dynamically select and control image processing operations. As discussed above, selection and control of an image processing operation may be based on various criteria, including tag information associated with pixels being processed by the system.

Referring now to FIG. 28, the figure schematically illustrates exemplary IF-THEN correlations between tag information and dynamic selection/control of image processing operations. Similar to previously described examples, FIG. 28 pertains to an exemplary method or system in which each of three different image processing operations may be applied using any of a variety of different implementations. Image processing operation $IP_1$, for example, may be applied using any implementation $IP_{1.a}$, $IP_{1.b}$, $IP_{1.c}$, etc. through $IP_{1.n}$.

Continuing with FIG. 28, various tag states are indicated in the left column, and depicted using the following notation: $\theta_k$, where the subscript denotes a particular tag state. Tag state $\theta_1$, for example, might reflect an overall luminance value for the video frame falling below a predefined threshold. Tag state $\theta_2$ might reflect (1) a high degree of motion for a pixel or pixels, (2) that average luminance values around the pixel or pixels of interest exceed a predefined threshold, and (3) high spatial frequencies. Tag state $\theta_3$ might reflect the presence of low angle artifacts, and that a previously applied image processing operation or operations had been tuned to increase image sharpness. These are but a few examples; a very large number of tag states are possible.

A given tag state may correlate in various ways with the selection and/or control of the image processing operations performed by the system. For example, as with tag states $\theta_1$ and $\theta_2$, a given tag state may correlate with selecting a specified implementation for each of a plurality of image processing operations. Indeed, in the depicted example, a specific implementation of processing operations $IP_1$, $IP_2$ and $IP_3$ is selected for each tag state $\theta_1$ and $\theta_2$.

Referring to tag state $\theta_3$, a given tag state may also correlate with selection (e.g., loading) of multiple different implementations of a given processing operation. Typically, as previously discussed, a given processing operation such as deinterlacing may be implemented in many different ways. Indeed, deinterlacing may be subject to several thousand or more implementations, taking into account the availability of multiple different deinterlacing algorithms, methodologies, filters, constants, etc. Thus, a given tag state may correlate with selection and loading of a subset of the available implementations for a given processing operation, as discussed above with reference to FIGS. 25-27.

Indeed, each of tag states state $\theta_1$, $\theta_2$ and $\theta_3$ correlate with control of multiple different image processing settings. States $\theta_1$ and $\theta_2$ correlate with control of multiple different image processing operations, while state $\theta_3$ correlates with specification of an available set of implementations for a given processing operation. In any case, due to multiple processing settings being affected, the correlation between the tag state and the control in these examples may be referred to as a "preset" or "pre-configuration." In other words, for exemplary tag state $\theta_1$, the system is preset so that existence of that tag state causes image processing settings to be preconfigured so that Image Processing Operation IP1 will be executed using implementation $IP1_b$, Image Processing Operation IP2 will be executed using implementation $IP2_a$ and Image Processing Operation IP3 will be executed using implementation $IP3_d$. For exemplary tag state $\theta_3$, the deinterlacing operation is preset or pre-calibrated so that specified deinterlacing implementations (i.e., $IP1_{a.4}$, $IP1_b$, $IP1_d$, $IP1_{f.8}$, $IP1_e$, $IP1_{e.3}$, $IP1_h$, $IP1_c$, $IP2_2g$, $IP2_{g.2}$, $IP2_{g.5}$, $IP2_k$, $IP2_n$, $IP2_{p.5}$, $IP2_x$, $IP2_{v.9}$) are loaded (e.g., from non-volatile storage) into a more readily accessible memory location, where they can be easily accessed and selected from at run time to perform image processing operations IP1 and IP2.

It should be understood that, in the case of the above-described presets/preconfigurations, the image settings may be modified or tuned prior to execution of the image processing operations. Such modification may be based, for example, on dynamically updated tag information for pixels moving through the processing pipeline.

Referring now to the tag states indicated toward the bottom of the right-hand column in FIG. 29, various states may exist that do not correlate with a presetting or pre-configuration of multiple image processing settings. As a practical matter, the number of possible tag states may be very large, such that it may be not be feasible or desirable at design time to establish pre-configurations for a large number of tag states. Rather, it may be desirable to establish a relatively limited number of preset tag states. In many cases, it is desirable to establish preset tag states based on frequency of tag state occurrence in video signals to be processed by the system. As indicated toward the bottom of FIG. 29, if no preset is available for a tag state, then no change may be effected or a default setting may be employed.

Use of the presets discussed above may provide numerous advantages, notwithstanding the potential for modification of processing settings prior to execution of image processing operations, and notwithstanding that, in practical limitations, the number of preset tag states may be limited to a relatively small number. One benefit is that, in a relatively small number of processing cycles, a processing decision is made that configures multiple different image processing settings. This processing decision typically is computationally inexpensive, and results in an effective and efficient approximation of the actual settings that will be employed to carry out the image processing operations. Then, as tag information is obtained and updated (e.g., by classifier 46, shown in FIG. 2), the initial approximations generated from the earlier tag states can be fine-tuned to produce more optimal image processing results.

In addition to the above benefits, use of presets/preconfiguration may avoid the system becoming trapped in local minima, or other localized equilibrium states that are sub-optimal. For example, without an informed initial approximation of processing settings (e.g., through use of presets), initial image processing settings may substantially vary from the optimal image processing settings. With large discrepancies between the initial and desired settings, the probability increases that intervening equilibrium states will inhibit convergence toward the desired optimal settings.

By establishing initial baseline settings through use of predefined, preset tag states, the system may be placed in a state that more closely approximates the actual settings that will be employed for pixel processing. Such initial approximation in many cases will facilitate fast convergence to the optimal settings using the tag-based dynamic control system/methods described herein. Alternatively, in many cases, the initial preconfigured settings will suffice without further tag-based modification/control.

Referring to FIG. 29, tag data may further include source identification information, in addition to the already-described classification and processing information. As shown in FIG. 29, source identification information 53 may be associated with a pixel or pixels, in addition to the classification and processing information. Also, as in prior examples, the association may be implemented in various ways, for example by transmitting the pixels and associated source identification information in a packetized format, and/or by pixels and source identifiers correlated via memory locations (e.g., in a database file, via pointers, etc.).

Source identification information 53 may include categories to indicate the manner in which the video source signal is broadcast (e.g., terrestrial, cable, satellite, etc.); the type of source device (e.g., set top box, DVD player, DVR, VCR, etc.); the type of source connection (e.g., component, composite, s-video, 1394 connection, USB, PCI, etc.); the quality of the digital source (high, medium, low, etc.); whether the source device is analog; the format/region of the source (NTSC, SECAM, PAL, HDTV, SDTV, North America, Asia, Western Europe, etc.) Furthermore, incoming video streams may include manufacturer-embedded fields or other identifiers that more specifically identify the source. For example, a manufacturer may embed identifiers within a video signal that identify the model number of the source device.

In any case, the present description includes a method and system in which source identification information is used to sort video signals into various established source categories. The source categories may be established in advance, and/or be dynamically and organically created during operation of the image processing system. Referring to FIG. 2, classifier 46 may be configured to perform a front-end classification operation prior to pixels being operated on by the different processing operations in the processing pipeline (e.g., deinterlacing, interpolation, etc.). This front-end classification may include, among other things, an analysis geared to classing the incoming signal into one or more of the established source categories (e.g., a medium-quality digital signal received through a set top box).

The tag states described with reference to FIG. 28 may include the just-described source information. Inclusion of the source information may provide numerous advantages. As previously discussed, a very large number of tag states are possible, and in many cases there are practical limitations on the number of presets/preconfigurations (FIG. 28) that can be established. In addition, classification decisions may be hindered by approximations, or by detected classification information varying slightly from an established tag preset. Thus, even though a given preset may be appropriate (e.g., the preset corresponding to one of tag states $\theta_1$, $\theta_2$ and $\theta_3$), that preset will not be employed if the corresponding tag state is not conclusively detected by classifier 46.

Accordingly, it will be desirable in many cases to employ source identification information 53 to facilitate selection of presets described in connection with FIG. 28. Use of the source information may increase the efficiency with which the system establishes presets, by enabling more conclusive determinations that particular presets are applicable to incoming video signals. Use of source information provides an increased richness to the tag data, and may increase the ability to establish larger numbers of presets at design time, thereby reducing the percentage of incoming signals that fall into the "miscellaneous" classification(s) for which no preset applies (i.e., corresponding to the lower portion of FIG. 28). Increased and more accurate application of presets may improve overall processing efficiency and quality, reduce the risks of sub-optimal equilibrium states, accelerate convergence of processing settings to optimal states(s), and provide numerous other advantages.

A first exemplary category of source information is information applicable to broadcast signals. Specifically, the front-end classification performed by classifier 46 may be geared to identify whether a broadcast signal is a conventional terrestrial broadcast, a cable signal, or from a satellite. Combinations of these signals may be detected as well. For example, the classifier may be configured to discern signal characteristics suggested that a conventional terrestrial broadcast signal had been digitized and sent via a cable broadcast infrastructure. Various criteria may be detected and evaluated to make these preliminary broadcast determinations. For example, terrestrial broadcast signals are often characterized by poor color representation and a high degree of signal noise. Accordingly, the system may be configured so that, upon preliminary detection of a terrestrial broadcast signal, image processing settings are selected to provide a higher degree of noise filtering (e.g., at a noise filter stage or within another block) and color processing algorithms to account for the poor color representation. In addition to dynamically controlling the substance of the processing operations, processing time may be allocated more heavily in favor of color processing and/or noise filtering, to account for the image quality issues that are typically found in terrestrial broadcast signals. Pipeline processing order may also be varied. For example, for a particularly noisy signal, noise filtering may be performed earlier in the pipeline operations, to give subsequent stages a cleaner signal to work with.

Satellite signals on the other hand, often suffer from digital blocking artifacts and signal interruptions. Upon detection of these phenomena, the classifier may append tag data to a pixel or pixels indicating a satellite signal as the probable source of the image data, and one or more processing operations in the pipeline may be preset to perform processing operations tuned to account for satellite signals.

Source identification tags may also be appended to video data to identify and account for the type of connection being used: component, composite, S-video, peripheral etc. Various image processing presets may be established in the pipeline based on preliminary identification of the connection type. For example, unlike for a composite connection, it is unnecessary to perform Y-C separation on a source connected through S-video. Thus, upon detection of a source connected via S-video, the Y-C separation functionality can be turned off within the pipeline, thereby conserving processed resources for allocation to other tasks within the pipeline. Detection of a component connection would allow for a relaxing of color processing operations, as component connections typically yield better color representations than S-video-connected devices.

The source information may further be used to preset image processing settings based on inferences about the type of source device. Detection of lossy signals and significant blocking artifacts may suggest, for example, that the attached source is a low quality DVD player. In response, the pipeline may be preset to provide enhanced noise filtering and other processing operations geared to addressing issues with low quality digital sources.

Indeed, the front-end classification may be configured to identify digital sources by general quality levels (e.g., low, medium, high) based on the presence of noise and artifacts. For high quality digital signals, presetting the pipeline will commonly involve turning off various processing functions. Low quality signals may involve more aggressive implementations of the various processing operations in the pipeline. However, in some cases, low signal quality will make it desirable to reduce or turn off certain functioning. For example, in highly compressed, low quality digital signal (e.g., from a digital video recorder), the high degree of noise may render motion estimation impossible or of little benefit. Accordingly, rather than waste processing on motion estimation, motion estimation can be turned off based on the preliminary source identification, allowing a re-allocation of processing time and/or use of more computationally expensive processing in other parts of the pipeline.

Source identification may also be performed to make at least preliminary identifications of format/standard (SECAM, PAL, NTSC, SDTV, HDTV, etc.) and region (North America, Western Europe, etc.) As with the previous examples, various processing presets may be established based on the presence of these source identifications in the tag data for a pixel or pixels.

The tag data may also include user information. For example, the user may be queried as to whether they are perceiving any particular artifacts or image quality problems. The user response may be incorporated into tag data for the video signal, such that dynamic control of image processing operations can be predicated on the user input. Specifically, one or more initial settings or preconfiguration of image processing operations may be effected based on the user input; a specific implementation or set of loaded implementations may be selected based on the user input, etc.

Figure 30:
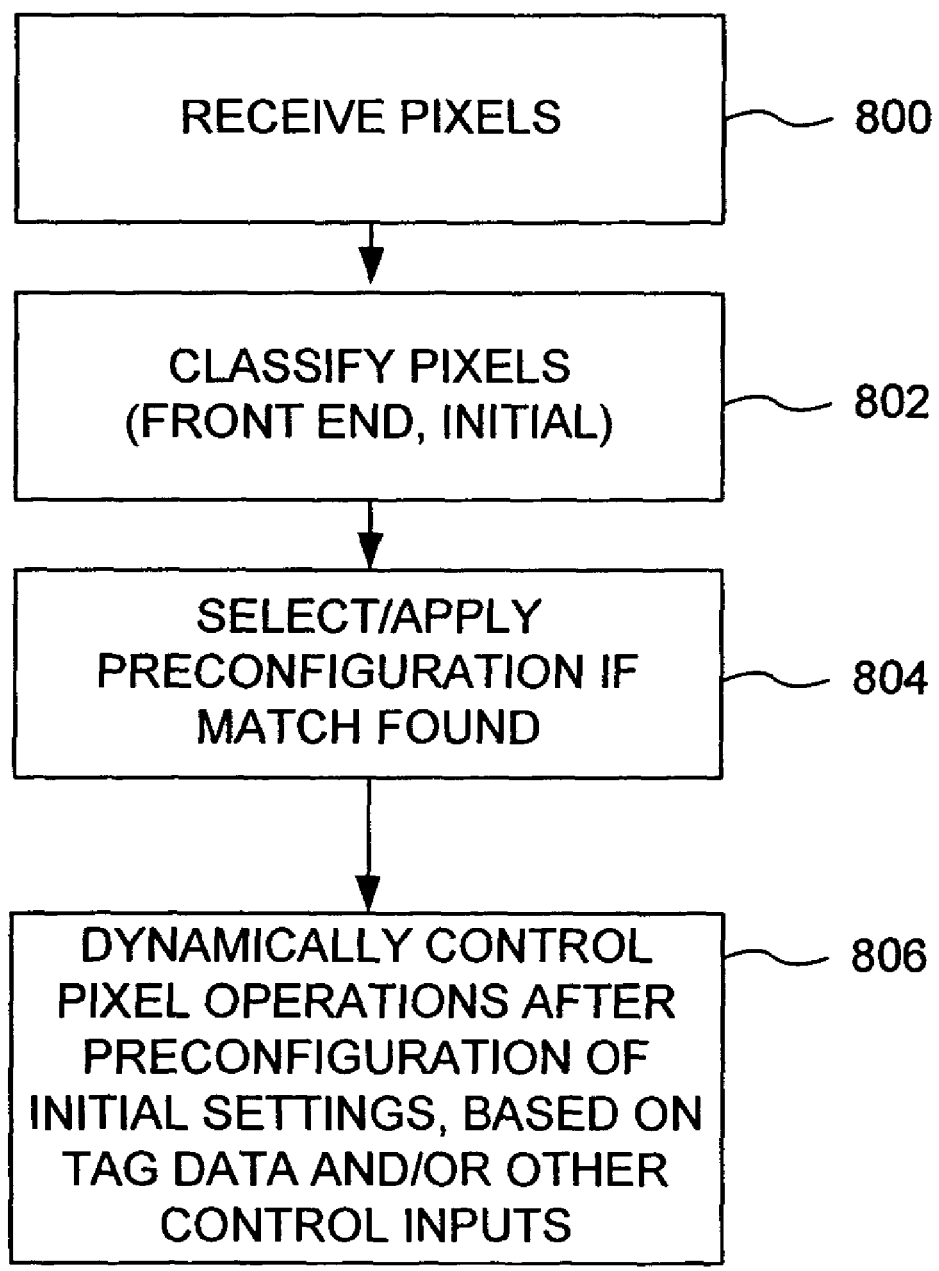
FIG. 30 is a depiction of an exemplary image processing method according to the present description.

Referring to FIG. 30, an exemplary method employing source identification is depicted. At 800, the method includes receiving a pixel or pixels of the video signal to be processed. At 802, an analysis of the pixels is performed (e.g., by classifier 46 of FIGS. 2 and 2A), this analysis step may be referred to as a "front end" or "initial" classification step, as it typically occurs before any of the image processing operations (e.g., deinterlacing, scaling, etc.). The initial classification step is performed to identify characteristics in the input signal indicative of the source of the signal, e.g., whether the signal is a terrestrial broadcast, from a high quality DVD player, in a particular format, etc. At 804, if a match to a pre-established or pre-defined source type is found, a corresponding preconfiguration is applied to one or more processing blocks in the pipeline. This may include, for example, selecting an initial algorithm or algorithm set for the deinterlacer and scalar, selection of scalar coefficients, etc. At 806, pixel processing operations are performed and dynamically controlled, as described above, using dynamically changing tag data as a basis for control inputs. Typically, the initial settings established by the source preconfigurations are modified dynamically during the pixel processing operations as tag data is refined and updated.

Additional examples of systems and methods having features that may be used in connection with the present examples may be found in:

U.S. patent application Ser. No. 11/183,238 of Carl J. Ruggiero entitled VIDEO IMAGE PROCESSING WITH PROCESSING TIME ALLOCATION, filed on Jul. 15, 2005;

U.S. patent application Ser. No. 11/183,193 of Carl J. Ruggiero entitled VIDEO IMAGE PROCESSING WITH UTILITY PROCESSING STAGE, filed on Jul. 15, 2005; and U.S. patent application Ser. No. 11/183,160 of Carl J. Ruggiero entitled VIDEO IMAGE PROCESSING WITH PARALELL PROCESSING, filed on Jul. 15, 2005, the disclosures of which are hereby incorporated by this reference, in their entireties and for all purposes.

While the present embodiments and method implementations have been particularly shown and described, those skilled in the art will understand that many variations may be made therein without departing from the spirit and scope of the invention. The description should be understood to include all novel and non-obvious combinations of elements described herein, and claims may be presented in this or a later application to any novel and non-obvious combination of these elements. Where claims recite "a" or "a first" element or the equivalent thereof, such claims should be understood to include incorporation of one or more such elements, neither requiring nor excluding two or more such elements.

The invention claimed is:

1. An image processing system, comprising:
a plurality of image processing modules, each being configured to carry out a different image processing operation, the image processing operations including at least one of deinterlacing, scaling, color processing, and boosting; and
a motion estimation module operably coupled with and shared by the image processing modules, where, for each image processing module, the motion estimation module is configured to obtain motion information for a pixel or pixels being applied as a processing input to the image processing module and the image processing module is configured to modify at least one pixel or pixels based on such motion information.

2. The system of claim 1, where one or more of the image processing operations is dynamically controlled based on motion information obtained from the motion estimation module.

3. The system of claim 1, further comprising controller and classifier logic operatively coupled with the plurality of image processing modules and configured to control operation of the image processing modules, the controller and classifier logic being further configured to repeatedly update tag data associated with pixels of video data being processed by the image processing system, where said repeatedly updated tag data is used to dynamically control operation of the plurality of image processing modules.

4. The system of claim 3, where the tag data includes classification information pertaining to characteristics of one or more pixels contained in the pixels of video data.

5. The system of claim 3, where the tag data includes processing information pertaining to processing operations applied to one or more pixels contained in the pixels of video data.

6. The system of claim 3, where the tag data includes source identification information associated with one or more pixels contained in the pixels of video data.

7. The system of claim 1, where the plurality of image processing modules are configured to sequentially process pixels of video data such that the pixels of video data are sequentially and successively processed by each of the plurality of image processing modules.

8. The system of claim 7, where the plurality of image processing modules define a sequential processing pipeline capable of processing video data in a FIFO manner, such that during operation, multiple frames of video data are being processed within the sequential processing pipeline.

9. The system of claim 8, further comprising controller and classifier logic configured to dynamically and unequally allocate processing time for the image processing modules.

10. The system of claim 9, where the controller and classifier logic is configured to allocate processing time from one of the multiple frames of video data to another of the multiple frames of video data.

11. The system of claim 9, where the controller and classifier logic is configured to allocate processing time from one portion of one of the multiple frames of video data to another portion of said frame of video data.

12. The system of claim 9, where the controller and classifier logic is configured to allocate processing time from one of the plurality of image processing modules to another of the plurality of image processing modules.

13. An image processing system, comprising:
a plurality of image processing modules, each being configured to carry out a different image processing operation, the image processing operations including at least one of deinterlacing, scaling, color processing, and boosting; and
a motion estimation module operably coupled with and shared by the image processing modules, where, for each image processing module, the motion estimation module is configured to obtain motion information for a pixel or pixels being applied as a processing input to the image processing module and the image processing module is configured to modify at least one pixel or pixels based on such motion information,
where the image processing system is configured to dynamically control each of the plurality of image processing modules based on the motion information.

14. An integrated circuit, comprising:
image processing logic configured to perform multiple different image processing operations on pixels of video data, where at least some of the multiple image processing operations are dynamically controllable to modify the pixels of video data based on motion information associated with pixels to be processed by the at least some of the multiple image processing operations, the multiple image processing operations including at least one of deinterlacing, scaling, color processing, and boosting; and
motion estimation logic operatively coupled with and shared by the at least some of the multiple image processing operations, the motion estimation logic being configured to obtain and provide motion information for use in effecting dynamic control of the at least some of the multiple different image processing operations.

15. The integrated circuit of claim 14, further comprising controller and classifier logic configured to dynamically control the multiple different image processing operations based on dynamically changing tag data associated with the pixels of video data.

16. The integrated circuit of claim 15, where the tag data includes classification information pertaining to characteristics of one or more pixels contained in the pixels of video data.

17. The integrated circuit of claim 15, where the tag data includes processing information pertaining to processing operations applied to one or more pixels contained in the pixels of video data.

18. The integrated circuit of claim 15, where the tag data includes source identification information associated with one or more pixels contained in the pixels of video data.

19. The integrated circuit of claim 15, where the image processing logic and controller and classifier logic are configured to execute one of the multiple different image processing operations by:
dynamically selecting, for each pixel or group of pixels to be processed by said one of the multiple different image processing operations, a particular implementation of said image processing operation; and
applying the particular implementation to the pixel or group of pixels, where the particular implementation is selected from a plurality of loaded implementations of said image processing operation, and
where the plurality of loaded implementations is varied from time to time during operation of the integrated circuit.

20. A method of processing video data, comprising:
receiving pixels of video data;
using a motion estimation module to perform a temporal analysis on the pixels of video data to obtain motion information;
performing a first image processing operation on the pixels of video data, the first image processing operation being dynamically controlled to modify the pixels of video data based on the motion information, wherein the first image processing operation is deinterlacing, scaling, color processing, or boosting;
after performance of the first image processing operation, using the motion estimation module to perform an additional temporal analysis on the pixels of video data, the additional temporal analysis being performed to update motion information for use in dynamic control of a second image processing operation which is different from the first image processing operation; and
performing the second image processing operation on the pixels of video data, the second image processing operation being dynamically controlled to modify the pixels of video data based on the updated motion information obtained from the motion estimation module.

21. An integrated circuit, comprising:
image processing logic configured to perform multiple different image processing operations on pixels of video data, where at least some of the multiple image processing operations are dynamically controllable to modify the pixels of video data based on motion information associated with pixels to be processed by the at least some of the multiple image processing operations, the multiple image processing operations including at least one of deinterlacing, scaling, color processing, and boosting; and
motion estimation logic operatively coupled with and shared by the at least some of the multiple image processing operations, the motion estimation logic being configured to obtain and provide motion information for use in effecting dynamic control of the at least some of the multiple different image processing operations, where the motion estimation logic is operative to obtain motion information by selecting and applying a selected motion estimation routine to the pixels of video data, the selected motion estimation routine being selected from a plurality of motion estimation routines loaded into a memory location.

22. The integrated circuit of claim 21, where the integrated circuit includes controller logic configured to monitor operation of the motion estimation logic and calibrate the motion estimation logic from time to time based on such monitoring, where said calibration includes unloading one or more of the plurality of motion estimation routines and replacing such unloaded routine or routines with a different motion estimation routine or routines.

23. The image processing system of claim 1, wherein the pixel or pixels are modified in a distinct frame.

24. The image processing system of claim 1, wherein the image processing modules process video data and where a frame rate of video data input into the image processing modules is equivalent to a frame rate of video data output from the image processing modules.

* * * * *